(12) United States Patent
Yamakawa et al.

(10) Patent No.: US 10,286,733 B2
(45) Date of Patent: May 14, 2019

(54) PNEUMATIC TIRE

(71) Applicant: The Yokohama Rubber Co., LTD., Minato-ku, Tokyo (JP)

(72) Inventors: Takahiro Yamakawa, Hiratsuka (JP); Yasutaka Akashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 377 days.

(21) Appl. No.: 14/648,684

(22) PCT Filed: Jan. 28, 2014

(86) PCT No.: PCT/JP2014/051754
§ 371 (c)(1),
(2) Date: May 29, 2015

(87) PCT Pub. No.: WO2014/136500
PCT Pub. Date: Sep. 12, 2014

(65) Prior Publication Data
US 2015/0298508 A1 Oct. 22, 2015

(30) Foreign Application Priority Data
Mar. 6, 2013 (JP) ................................. 2013-044634

(51) Int. Cl.
*B60C 11/03* (2006.01)
*B60C 11/12* (2006.01)
*B60C 11/13* (2006.01)

(52) U.S. Cl.
CPC ...... *B60C 11/1307* (2013.01); *B60C 11/0304* (2013.01); *B60C 11/0309* (2013.01);
(Continued)

(58) Field of Classification Search
CPC ............. B60C 11/1236; B60C 11/1369; B60C 11/0309; B60C 11/1307; B60C 11/1218;
(Continued)

(56) References Cited

U.S. PATENT DOCUMENTS 4,807,679 A * 2/1989 Collette .............. B60C 11/0306
152/209.18
5,783,002 A * 7/1998 Lagnier .................. B60C 11/12
152/209.1
(Continued)

FOREIGN PATENT DOCUMENTS

CN 203142296 U * 8/2013
JP 01-309806 A * 12/1989
(Continued)

OTHER PUBLICATIONS

Machine translation for Japan 2012-086665 (no date).*
(Continued)

*Primary Examiner* — Steven D Maki
(74) *Attorney, Agent, or Firm* — Thorpe North & Western

(57) ABSTRACT

A tread pattern of a pneumatic tire includes two outer circumferential main grooves and two inner circumferential main grooves. Each of the two inner circumferential main grooves comprises a first groove wall and a second groove wall facing the first groove wall. The first groove walls include first oblique wall elements that extend obliquely outward in a tire width direction and second oblique wall elements that extend obliquely inward in the tire width direction and extend for a shorter length than the first oblique wall elements. The second groove walls include third oblique wall elements that extend obliquely inward in the tire width direction and fourth oblique wall elements that extend obliquely outward in the tire width direction and extend for a shorter length than the third oblique wall elements.

19 Claims, 12 Drawing Sheets

(52) U.S. Cl.
CPC ...... *B60C 11/1218* (2013.01); *B60C 11/1236* (2013.01); *B60C 11/13* (2013.01); *B60C 11/1353* (2013.01); *B60C 11/1369* (2013.01); *B60C 2011/0346* (2013.01); *B60C 2011/0348* (2013.01); *B60C 2011/0351* (2013.01); *B60C 2011/0369* (2013.01); *B60C 2011/0381* (2013.01); *B60C 2011/0393* (2013.01); *B60C 2011/0395* (2013.01); *B60C 2011/1213* (2013.01); *B60C 2011/1338* (2013.01)

(58) Field of Classification Search
CPC ..... B60C 2011/1338; B60C 2011/0346; B60C 2011/0369; B60C 2011/0381; B60C 2011/0395; B60C 2011/1213; B60C 2011/0348; B60C 11/12; B60C 11/1263; B60C 11/1353; B60C 11/13; B60C 2011/0351; B60C 2011/0393
See application file for complete search history.

(56) References Cited

U.S. PATENT DOCUMENTS

| | | | | |
|---|---|---|---|---|
| 6,427,737 | B1 * | 8/2002 | Katayama | B60C 11/11 152/209.21 |
| 6,571,844 | B1 * | 6/2003 | Ochi | B60C 11/11 152/209.18 |
| D485,230 | S * | 1/2004 | Williams | D12/564 |
| 2007/0240801 | A1 | 10/2007 | Tanaka | |
| 2008/0156405 | A1 * | 7/2008 | Tanabe | B60C 11/11 152/209.18 |
| 2009/0107601 | A1 * | 4/2009 | Niknam | B60C 11/0306 152/209.18 |
| 2009/0229721 | A1 * | 9/2009 | Ikeda | B60C 11/0306 152/209.18 |
| 2009/0255614 | A1 * | 10/2009 | Ebiko | B60C 11/0302 152/209.8 |
| 2009/0277550 | A1 | 11/2009 | Ikeda | |
| 2009/0294003 | A1 * | 12/2009 | Horiuchi | B60C 11/0309 152/209.23 |
| 2009/0320981 | A1 * | 12/2009 | Matsumoto | B60C 11/0306 152/209.8 |

FOREIGN PATENT DOCUMENTS

| | | | |
|---|---|---|---|
| JP | 11-342708 A | * | 12/1999 |
| JP | 2003-165311 A | * | 6/2003 |
| JP | 2006-192959 | | 7/2006 |
| JP | 2007-186053 | | 7/2007 |
| JP | 2007-283943 | | 11/2007 |
| JP | 2009-090874 | | 4/2009 |
| JP | 2009-248961 | | 10/2009 |
| JP | 2009-269500 | | 11/2009 |
| JP | 2010-069956 | | 4/2010 |
| JP | 2010-184616 | | 8/2010 |
| JP | 2012-086665 A | * | 5/2012 |
| KR | 10-869025 B1 | * | 11/2008 |

OTHER PUBLICATIONS

Machine translation for CN 203142296 (no date).*
Machine translation for Korea 10-869025 (no date).*
Machine translation for Japan 01-309806 (no date).*
Machine translation for Japan 2003-165311 (Year: 2017).*
Machine translation for Japan 11-342708 (Year: 2017).*
International Search Report for International Application No. PCT/JP2014/051754 dated Apr. 1, 2014, 4 pages, Japan.

* cited by examiner

PNEUMATIC TIRE

TECHNICAL FIELD

The present technology relates to a pneumatic tire provided with a tread pattern.

BACKGROUND

All-season tires used year-round must be capable of handling various types of road conditions, such as dry, wet, and snowy. A tire comprising for example, four circumferential grooves, a center land portion region defined by two inner circumferential main grooves, and two intermediate land portion regions defined by an outer circumferential main groove and inner circumferential main groove is known in the art as a tire that is capable of handling various types of road conditions (Japanese Unexamined Patent Application Publication No. 2010-184616A). In the tire of Japanese Unexamined Patent Application Publication No. 2010-184616A, a lug groove is provided in the center land portion region, and projections (peaks) constituted by locally raised portions of the groove bottom that are higher than in the other parts of the groove are formed in the lug groove near the tire centerline.

In accordance with the tire of Japanese Unexamined Patent Application Publication No. 2010-184616A, it is possible to improve the block rigidity of the center land portion, thereby putatively allowing for improved steering stability during on-road driving. The tire also effectively discharges water, putatively allowing for the prevention of hydroplaning.

An all-season tire preferably exhibits wear resistance on dry road surfaces and steering stability on wet and snowy road surfaces. However, the tire disclosed in Japanese Unexamined Patent Application Publication No. 2010-184616A does not exhibit a sufficient balance between these various capabilities.

SUMMARY

The present technology provides a pneumatic tire that exhibits a superior balance between wear resistance on dry road surfaces and wet steering stability and steering stability on snow.

One aspect of the present technology is a pneumatic tire in which a tread pattern is formed in a tread portion.

The Tread Pattern Includes:

a circumferential direction main groove group constituted by four circumferential main grooves parallel to the tire circumferential direction, including two outer circumferential main grooves disposed to an outer side in a tire width direction and two inner circumferential main grooves disposed between the outer circumferential main grooves, a centerline of the tire passing between the inner circumferential main grooves; and a plurality of lug grooves that traverse a region of a center land portion defined by the two inner circumferential main grooves, the center land portion through which the tire centerline passes and regions of two intermediate land portions defined by the outer circumferential main grooves and the inner circumferential main grooves to form a plurality of land portion blocks in the region of the center land portion and the regions of the intermediate land portions.

Each of the two inner circumferential main grooves comprises a first groove wall and a second groove wall facing the first groove wall.

The first groove wall comprises a first oblique wall element that extends obliquely outward in the tire width direction from a first direction in the tire circumferential direction and a second oblique wall element that extends obliquely inward in the tire width direction from the first direction and extends for a shorter length than the first oblique wall element, the first groove wall being made up of a plurality of sets of first oblique wall elements and second oblique wall elements.

The second groove wall comprises a third oblique wall element that extends obliquely inward in the tire width direction from the first direction and a fourth oblique wall element that extends obliquely outward in the tire width direction from the first direction and extends for a shorter length than the third oblique wall element, the second groove wall being made up of a plurality of sets of third oblique wall elements and fourth oblique wall elements.

The first groove wall and the second groove wall of each of the two inner circumferential main grooves are preferably disposed so that two of groove walls of the inner circumferential main grooves contacting the center land portion form a combination of the first groove wall and the second groove wall.

The first oblique wall elements and the third oblique wall elements of each of the inner circumferential main grooves are preferably disposed at offset positions in the tire circumferential direction.

Each of the center land portion blocks positioned in the center land portion is preferably provided with at least two center sipes that extend in parallel with center lug grooves that form the center land portion blocks and connect the two inner circumferential main grooves, each of the center sipes extending in a wavy pattern formed by deviations in a direction orthogonal to the center sipe extension direction and wall surfaces forming the center sipe comprise raised-and-recessed surface portions extending in a wavy pattern formed by deviations toward the bottom of the sipe.

It is preferable for two center sipes to be provided per each of the center land portion blocks, the two center sipes being provided to different sides of the center of the center land portion block with respect to the tire circumferential direction, and for recessed portions of the wavy patterns of the two center sipes to face each other with respect to a line that passes through the center and is parallel to the center lug groove, and for raised portions of the wavy patterns of the two center sipes to face each other with respect to the line.

It is preferable for intermediate land portion blocks constituted by land portion blocks in the regions of the intermediate land portions to be provided with intermediate sipes that are parallel with intermediate lug grooves that traverse the regions of the intermediate land portions, for a region to the outside of the circumferential direction main groove group in the tire width direction to be provided with the shoulder land portions, for the shoulder land portions to be provided with shoulder sipes, for the intermediate sipes to be sipes that extend in straight or curved lines, and for each of the shoulder sipes to comprise a portion that extends in a wavy pattern formed by deviations in a direction orthogonal to the shoulder sipe extension direction, and for wall surfaces forming the shoulder sipe to comprise a raised-and-recessed surface portion that extends in a wavy pattern formed by deviations toward the bottom of the sipe.

Moreover, it is preferable for a region on the outer side of the circumferential direction main groove group in the tire width direction to be provided with the shoulder land portions, for each of the shoulder land portion regions to be provided with a shoulder lug groove that extends from an outer side in the tire width direction toward one of the outer circumferential main grooves, the shoulder lug groove being closed off along the middle thereof without connecting with either of the outer circumferential main grooves so that the shoulder land portion forms a continuous land portion that continuously extends in the tire circumferential direction, and the shoulder lug groove to have a groove width that is greater than the maximum groove width of the lug groove.

It is preferable for the shoulder lug grooves to comprise a first region that extends from an outer end in the tire width direction toward one of the outer circumferential main grooves and a second region that connects with the first region and extends to the closed end of the shoulder lug groove, the second region having a groove depth that is less than that of the first region, for a shoulder sipe extending across the continuous land portion so as to connect one of the outer circumferential main grooves and the second region of the shoulder lug groove to be formed in the regions of the shoulder land portions, and for the shoulder sipe to have a groove depth that is greater than that of the second region of the shoulder lug groove.

The groove bottom portion in the second region of the shoulder lug groove is preferably raised to form gradients so as to be higher than the groove bottom portion in the first region.

An outer end of the shoulder sipe in the tire width direction is preferably formed so as to penetrate into the groove bottom in the second region of the shoulder lug groove.

It is preferable for narrow circumferential grooves that extend in the tire circumferential direction and have narrower groove widths than the shoulder lug grooves to be provided in the shoulder land portion regions, for the narrow circumferential grooves to have groove depths that are less than the maximum groove depths of the shoulder lug grooves, and for the narrow circumferential grooves to intersect with the shoulder lug grooves on inner sides in the tire width direction with respect to centers in the tire width direction of the ground contact regions of the shoulder land portions, the ground contact regions within a ground contact width of the tire.

The groove depth of the shoulder lug grooves is preferably equal to that of the narrow circumferential grooves at a position where the shoulder lug grooves intersect with the narrow circumferential grooves.

Arc-shaped grooves that extend in a curving arc so as to connect with the outer circumferential main grooves defining the intermediate land portion blocks and the lug grooves defining the intermediate land portion blocks are preferably formed in the intermediate land portion blocks of the intermediate land portions.

It is preferable for at least one of the center lug grooves provided in the center land portion region and the intermediate lug grooves provided in the intermediate land portion region to include a first lug groove region and a second lug groove region that is connected to the first lug groove region, the first lug groove region having a narrower groove width than the second lug groove region and a shallower groove depth than the second lug groove region.

It is preferable for center lug grooves each including the first lug groove region and the second lug groove region to be formed in the center land portion region, the first lug groove region being formed in a central region of the center lug groove in the direction in which the center lug groove extends, the central region traversing the tire centerline, and the second lug groove region being formed on the outer side in the tire width direction of the central region.

It is preferable for intermediate lug grooves each including the first lug groove region and the second lug groove region to be formed in the intermediate land portions, the first lug groove region being formed on the inner side in the tire width direction of the second lug groove region.

The tire according to the present technology exhibits a superior balance between wear resistance on dry road surfaces and wet steering stability and steering stability on snow.

DETAILED DESCRIPTION

The following is a detailed description of the pneumatic tire according to the present technology.

Figure 1:
FIG. 1 is an external view of the entirety of a tire of an embodiment of the present technology.

FIG. 1 illustrates the exterior of a pneumatic tire 1 of an embodiment of the present technology.

The pneumatic tire (hereinafter, referred to as a tire) 1 is a tire for a passenger vehicle.

The structure and rubber members of the tire 1 of the present technology may be either publicly known or novel, and are not particularly limited in the present technology.

Figure 2:
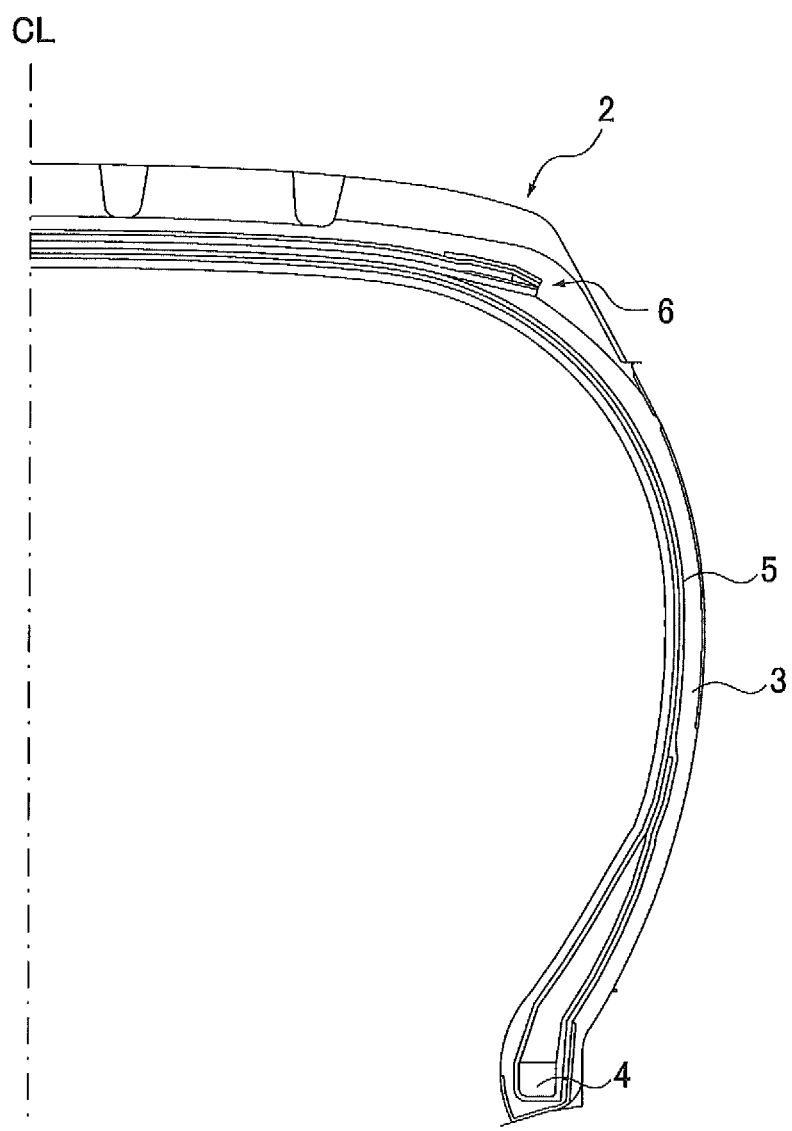
FIG. 2 is a cross-sectional view of a portion of the tire depicted in FIG. 1.

As illustrated in FIG. 2, the tire 1 includes a tread portion 2, a side wall 3, a bead 4, a carcass layer 5, and a belt layer 6. FIG. 2 is a meridian cross-sectional view illustrating a portion of the tire 1. In addition, the tire 1 includes an inner liner layer and the like that are not illustrated in the drawings. The side wall 3 and the bead 4 are each formed as pairs that are arranged on both sides in the tire width direction so as to sandwich the tread portion 2.

The tread portion 2, the bead 4, the belt layer 6, the inner liner, and the like may be either publicly known or novel, and are not particularly limited in the present technology.

Figure 3:
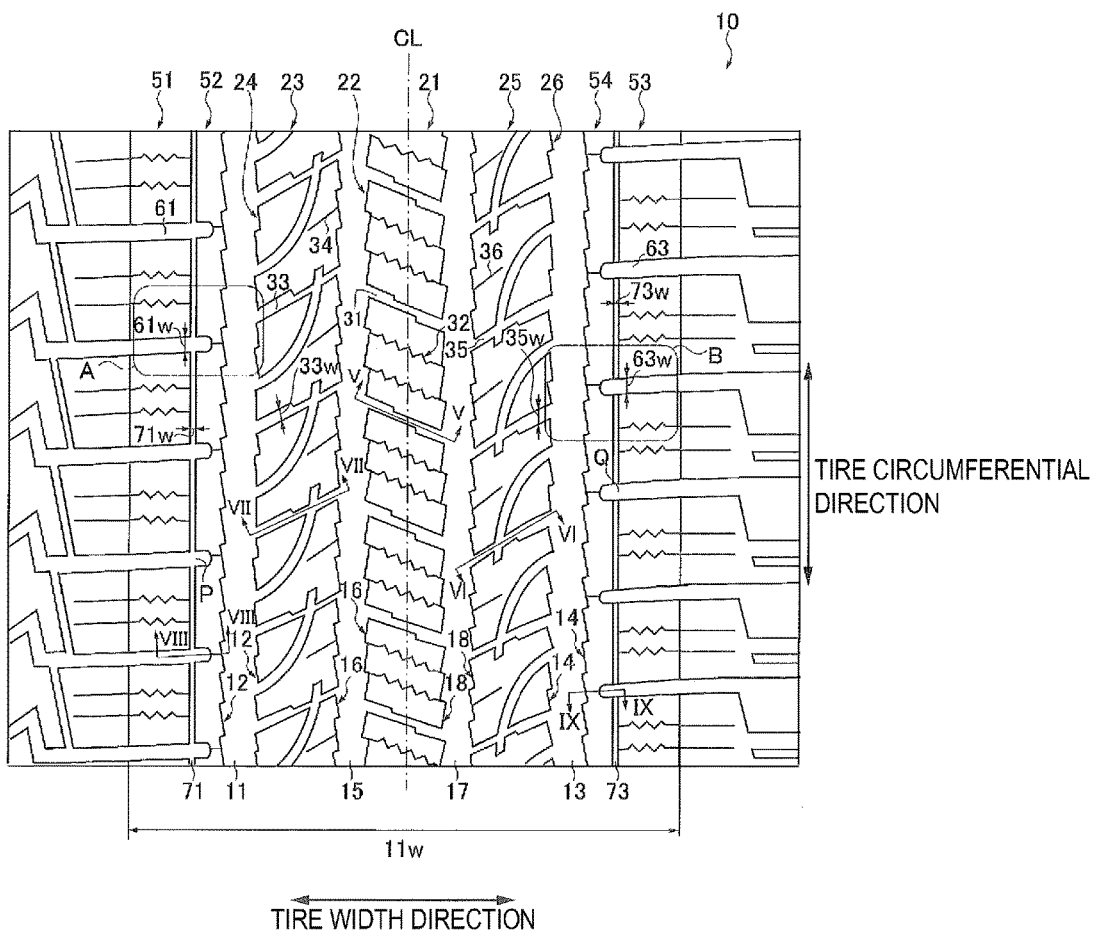
FIG. 3 is a view of the tread pattern of the tire depicted in FIG. 1 spread flat for ease of illustration.

The tread pattern 10 illustrated in FIG. 3 is formed in the tread portion 2 of the tire 1 according to the present technology. FIG. 3 is a plan view of the tread pattern 10 of the tire 1 of the present technology spread flat for ease of illustration. The tire 1 having the tread pattern 10 may be suitably used as a tire for a passenger vehicle. The dimensions of the various elements of the tire in the following description are examples of values used in tires for passenger vehicles.

A tire mounting orientation when mounting a tire to the vehicle for facing one of the sides of the tire outward from the vehicle is predetermined for the tire 1 of the present technology. The label CL in FIG. 3 indicates the centerline of the tire. The tire 1 is mounted on a vehicle with the region of the tread pattern 10 to the left of the centerline of the tire CL as seen in FIG. 3 facing vehicle inner side and the region of the tread pattern 10 to the right of the tire centerline CL as seen in FIG. 3 facing vehicle outer side; the tire may also be mounted on a vehicle with the reverse orientation. Information regarding mounting orientation is displayed, for example, on the tire surface or side wall surface in the form of letters, symbols, or the like.

While the tire 1 is mounted on a vehicle, the tread pattern 10 comes into contact with the road surface in a region in the tire width direction indicated by a ground contact width 11$w$. The ground contact edges are determined as described below. The ground contact edges are end portions in the tire width direction of a contact patch when the tire 10 is brought into contact with a horizontal surface under conditions in which the tire 10 is fitted to a standard rim and inflated to a standard inner pressure, and a load to be applied is set to 88% of a standard load. Herein, "standard rim" refers to an "application rim" as defined by the Japan Automobile Tyre Manufacturers Association Inc. (JATMA), a "design rim" as defined by the Tire and Rim Association, Inc. (TRA), or a "measuring rim" as defined by the European Tyre and Rim Technical Organisation (ETRTO). "Standard inner pressure" refers to "maximum air pressure" as defined by JATMA, the maximum value in "tire load limits at various cold inflation pressures" as defined by TRA, or "inflation pressure" defined by ETRTO. The standard inner pressure is, for example, 180 kPa if the tire is for use with a passenger vehicle. "Standard load" refers to "maximum load resistance" defined by JATMA, the maximum value in "tire load limits at various cold inflation pressures" defined by TRA, or "load capacity" defined by ETRTO.

The tire width direction in the present technology refers to the direction of the central axis of rotation of the tire 1, and the tire circumferential direction refers to a direction in which the rotating surface of the tread surface rotates, the rotating surface being formed when the tire 1 rotates around the central axis of rotation of the tire. The above directions are expressed in FIG. 3. The tire rotation direction of the tread pattern 10 of the present technology is not particularly limited. "Outer side in the tire width direction" refers to a side away from the tire centerline CL with respect to the position or portion being compared, and "inner side in the tire width direction" refers to a side approaching the tire centerline CL with respect to the position or portion being compared.

The tire 1 of the present technology may have a pitch with the same dimensions in the tire circumferential direction as the tread pattern 10 arranged in the tire circumferential direction, or the tire 1 may have a plurality of types of pitches with different dimensions in the tire circumferential direction from the tread pattern 10 arranged in the tire circumferential direction to allow for a pitch variation.

The tread pattern 10 comprises a circumferential direction main groove group including four circumferential main grooves 11, 13, 15, 17 that are parallel to the tire circumferential direction, and a plurality of center lug grooves 31, 33, 35.

(Circumferential Direction Main Groove Group)

The circumferential direction main groove group includes two outer circumferential main grooves 11, 13 and two inner circumferential main grooves 15, 17. The outer circumferential main grooves 11, 13 are disposed on the outer side of the inner circumferential main grooves 15, 17 in the tire width direction. The two inner circumferential main grooves 15, 17 are disposed between the outer circumferential main grooves 11, 13. The tire centerline CL passes between the inner circumferential main grooves 15, 17 with respect to the tire width direction.

Each of the circumferential main grooves 11, 13, 15, 17 includes a pair of main groove walls 12, 12, 14, 14, 16, 16, 18, 18 that extend in the tire circumferential direction in a zigzag shape. This increases the edge component of the tread surface, improving wet steering stability and steering stability on snow. Each of the main groove walls 12, 14, 16, 18 has a shape comprising an alternating series of wall surfaces that are prominently oblique with respect to the tire circumferential direction and wall surfaces having an angle that is less oblique with respect to the tire circumferential direction than that of the first wall surfaces.

Figure 4A:
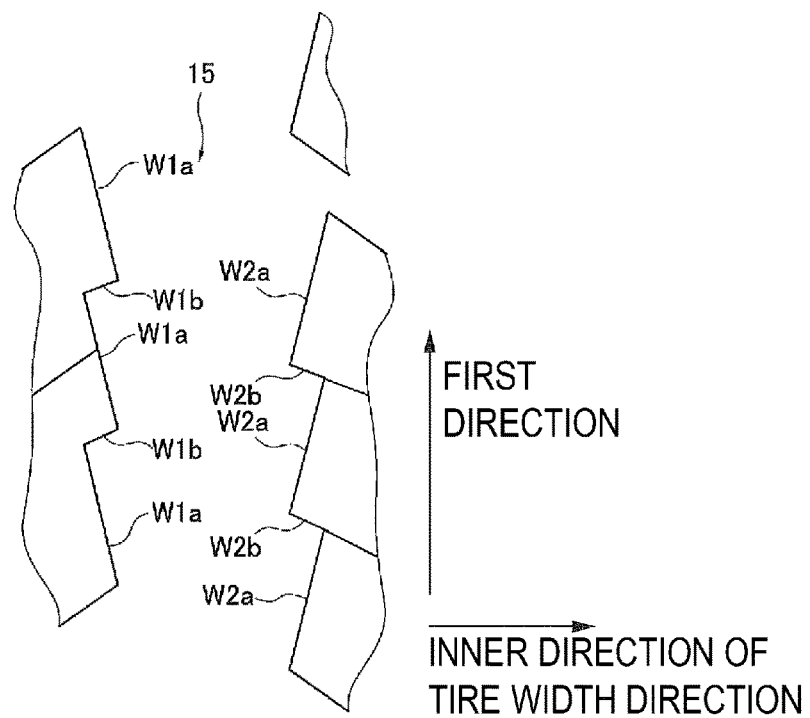
FIGS. 4A and 4B are magnified views describing the shapes of inner circumferential main grooves of the tread pattern depicted in FIG. 3.
Figure 4B:
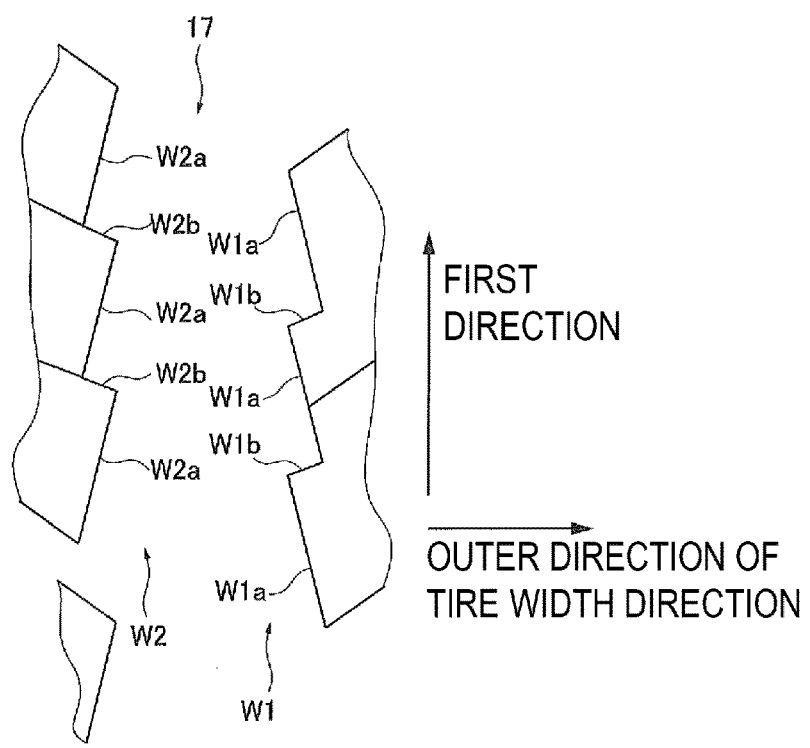

FIGS. 4A and 4B are magnified views describing the shapes of the inner circumferential main grooves 15, 17.

Each of the two inner circumferential main grooves 15, 17 comprises a first groove wall W1 and a second groove wall W2 facing the first groove wall W1 as main groove walls 16, 18. The first groove wall W1 includes first oblique wall elements W1$a$ that extend obliquely on the outer side in the tire width direction from a first direction in the tire circumferential direction and second oblique wall elements W1$b$ that extend obliquely on the inner side in the tire width direction from the first direction for shorter lengths than the first oblique wall elements W1$a$. The first groove wall W1 is made up of a plurality of sets of first oblique wall elements W1$a$ and second oblique wall elements W1$b$. The second groove wall W2 includes third oblique wall elements W2$a$ that extend obliquely on the inner side in the tire width direction from the first direction and fourth oblique wall elements W2$b$ that extend obliquely on the outer side in the tire width direction from the first direction for shorter lengths than the third oblique wall elements W2$a$. The second groove wall W2 is made up of a plurality of sets of third oblique wall elements W2$a$ and fourth oblique wall elements W2$b$.

Specifically, the groove wall of the main groove walls 16 of the inner circumferential main groove 15, positioned on the outer side in the tire width direction (the left groove wall of the inner circumferential main groove 15 in FIG. 4A) is a first groove wall W1 including first oblique wall elements W1$a$ and second oblique wall elements W1$b$. The groove wall positioned on the inner side in the tire width direction (the right groove wall of the inner circumferential main groove 15 in FIG. 4A) is a second groove wall W2 including third oblique wall elements W2a and fourth oblique wall elements W2b.

The groove wall of the main groove walls 18 of the inner circumferential main groove 17, positioned on the outer side in the tire width direction (the right groove wall of the inner circumferential main groove 17 in FIG. 4B) is a second groove wall W2 including third oblique wall elements W2a and fourth oblique wall elements W2b. The groove wall positioned on the inner side in the tire width direction (the left groove wall of the inner circumferential main groove 17 in FIG. 4B) is a first groove wall W1 including first oblique wall elements W1a and second oblique wall elements W1b.

By combining such facing groove walls for the first groove wall W1 and the second groove wall W2, the groove width is reduced due to the first oblique wall elements W1a and the third oblique wall elements W2a of the inner circumferential main grooves 15, 17. This reduction in groove width can be used to compact snow entering the inner circumferential main grooves 15, 17 when driving on snowy roads to form hard clumps of snow. This increases snow shear force, allowing for increased steering stability on snow. It is thus possible to achieve wear resistance, wet steering stability, and steering stability on snow.

The facing main groove walls 12, 12 of the outer circumferential main groove 11 are both first groove walls W1. The facing main groove walls 14, 14 of the outer circumferential main groove 13 are both second groove walls W2. In this way, the groove walls of the outer circumferential main grooves 11, 13 are configured so as to yield a constant groove width using either a combination of first oblique wall elements W1a and first oblique wall elements W1a or a combination of third oblique wall elements W2a and third oblique wall elements W2a, thereby allowing for improved wet steering stability. In the present embodiment, the main groove walls 12, 12 of the outer circumferential main groove 11 may be second groove walls W2, and the main groove walls 14, 14 of the outer circumferential main groove 13 may be first groove walls W1. The main groove walls 12, 12 of the outer circumferential main groove 11 or the main groove walls 14, 14 of the outer circumferential main groove 13 may be a combination of a first groove wall W1 and a second groove wall. One of the outer circumferential main groove 11 and the outer circumferential main groove 13 may have a combination of a first groove wall W1 and a second groove wall W2. However, it is preferable to use only one of either first groove walls W1 or second groove walls W2 as the main groove walls 12, 12 of the outer circumferential main groove 11 and the main groove walls 14, 14 of the outer circumferential main groove 13 for maintaining a constant groove width in order to improve wet steering stability.

The first oblique wall elements W1a and the third oblique wall elements W2a of the inner circumferential main grooves 15, 17 are preferably disposed at offset positions in the tire circumferential direction.

Figure 5:
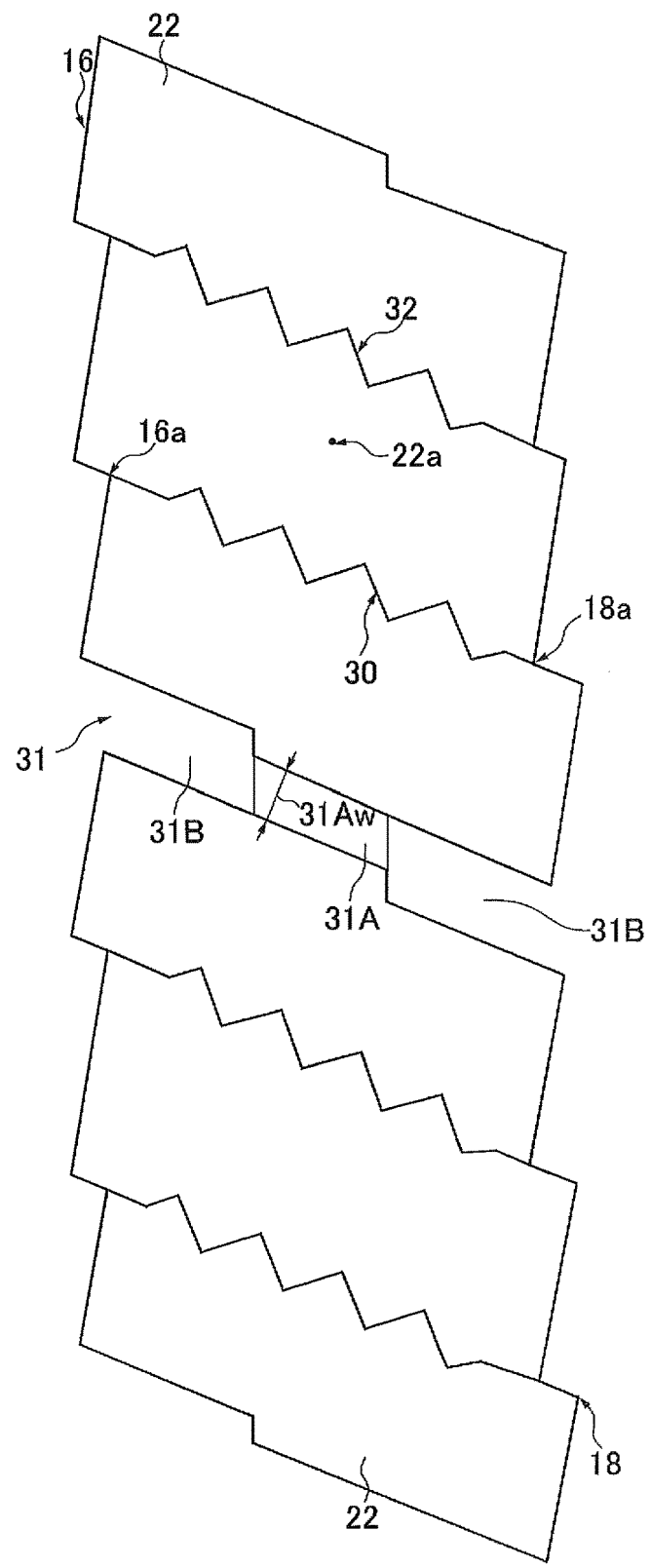
FIG. 5 is a magnified view of the tread pattern depicted in FIG. 3 focusing on land portion blocks in a center land portion.

FIG. 5 is a magnified view of the tread pattern 10 focusing on land portion blocks 22 in a center land portion 21. As illustrated in FIG. 5, each of the main groove walls 16, 18 defining the center land portion 21, to be described below, comprises bend points 16a, 18a where the wall is bent so as to be recessed toward the center land portion 21. The two main groove walls 16, 18 are preferably formed so that one land portion block 22 is provided with two bend points 16a, 18a each. This allows both of two sipes 32, 30, to be described below, to be provided so as to connect a bend point 16a and a bend point 18a.

The groove depths and groove widths of the circumferential main grooves 11, 13, 15, 17 are equal, but may be different in another embodiment. The total of the groove widths of the circumferential main grooves 11, 13, 15, 17 is preferably from 15% to 25% of the ground contact width 11w.

It is preferable to dispose the first groove walls W1 and the second groove walls W2 of each of the inner circumferential main grooves 15, 17 so that two of main groove walls 16, 18 of the inner circumferential main grooves 15, 17 contacting the center land portion 21 form a combination of the first groove wall W1 and the second groove wall W2. This allows for the provision of groove walls that undulate at various angles with respect to the tire circumferential direction in tread half regions delineated by the centerline CL, allowing a variety of edge components to be provided. It is thereby possible to improve steering stability on snow.

(Center Lug Grooves 31)

Center lug grooves 31 are defined by the two inner circumferential main grooves 15, 17, and are formed traversing the region of the center land portion 21 to form a plurality of center land portion blocks 22 in the region of the center land portion 21.

Figure 6:
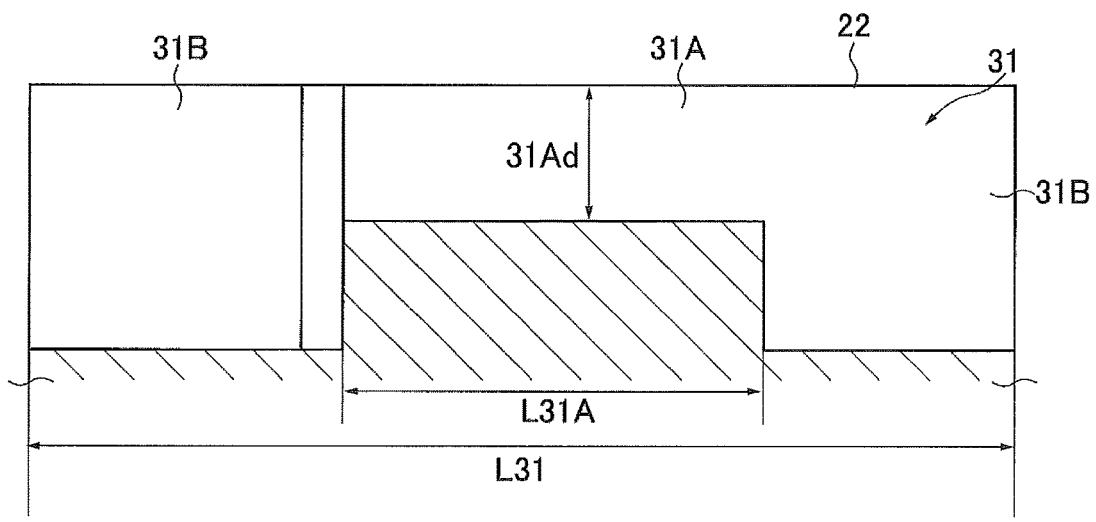
FIG. 6 is a cross-sectional view of the tread surface of the tire depicted in FIG. 1 as viewed from a direction of a line V-V in FIG. 3.

As illustrated in FIG. 5, each of the center lug grooves 31 includes a central region 31A (first lug groove region) constituting a central region in the center lug grooves 31 extension direction with respect to the tire width direction, and two outer regions 31B (second lug groove regions) that are formed on the outer side in the tire width direction of the central region 31A and connected with the central region 31A. The central region 31A extends a predetermined distance in the center lug grooves 31 extension direction. As illustrated in FIG. 5, the central region 31A has a groove width 31Aw that is less than that of the outer regions 31B, and, as illustrated in FIG. 6, a groove depth 31Ad that is less than the groove depths of the outer regions 31B (see FIG. 6). FIG. 6 is a cross-sectional view of the tread surface of the tire 1 as viewed from a direction of line V-V in FIG. 3.

The provision of a central region 31A configured in this way in a region of a portion of the center lug grooves 31 in the groove extension direction ensures the rigidity of the center land portion 21, suppressing reductions in wear resistance on dry road surfaces, and ensures groove volume in the center lug grooves 31 necessary to improve water discharge performance and snow shear force, allowing for improved wet steering stability and steering stability on snow. In other words, it is thus to achieve wear resistance, wet steering stability, and steering stability on snow. In particular, because the central region 31A is formed over a predetermined length of a region in the center lug grooves 31 extension direction, block rigidity can be considerably improved over that of a conventional tire in which portions that are shallower (raised) than elsewhere are locally formed along the length of the lug groove. Because the central region 31A is formed in a region of the center lug groove 31 in the direction in which the center lug groove 31 extends, the central region 31A traversing the tire centerline CL, and the outer regions 31B are formed in a region on both sides of the central region 31A, a high balance is achieved between wear resistance and wet steering stability and steering stability on snow.

The groove length L31A of the central region 31A of the center lug groove 31 is preferably from 30 to 80% of the groove length L31 of the center lug groove 31, more preferably from 40 to 70%. Setting the groove length L31A (see FIG. 6) of the central region 31A to not more than the upper limit value of the range described above ensures sufficient groove volume in the center lug groove 31, and setting the length not less than the lower limit value of the range described above ensures sufficient block rigidity in the center land portion 21. The groove length L31A of the central region 31A of the center lug groove 31 is, for example, 55% of the groove length L31 of the center lug groove 31.

The center lug grooves 31 preferably extend obliquely with respect to the tire circumferential direction, as illustrated in FIG. 3. The angle thereof with respect to the tire circumferential direction is, for example from 60 to 85° in the counterclockwise direction. Having the center lug grooves 31 be highly oblique with respect to the tire circumferential direction ensures the block rigidity of the center land portion 21 against lateral forces, and improves wet steering stability and steering stability on snow at low steering angles while the vehicle is traveling.

The center lug grooves 31 may each extend in straight lines or in gentle curves.

(Intermediate Lug Grooves 33, 35)

The intermediate lug grooves 33 traverse the region of the intermediate land portion 23 defined by the outer circumferential main groove 11 and the inner circumferential main groove 15, and form a plurality of intermediate land portion blocks 24 in the region of the intermediate land portion 23. The intermediate lug grooves 35 traverse the region of the intermediate land portion 25 defined by the outer circumferential main groove 13 and the inner circumferential main groove 17, and form a plurality of intermediate land portion blocks 26 in the region of the intermediate land portion 25.

Figure 7:
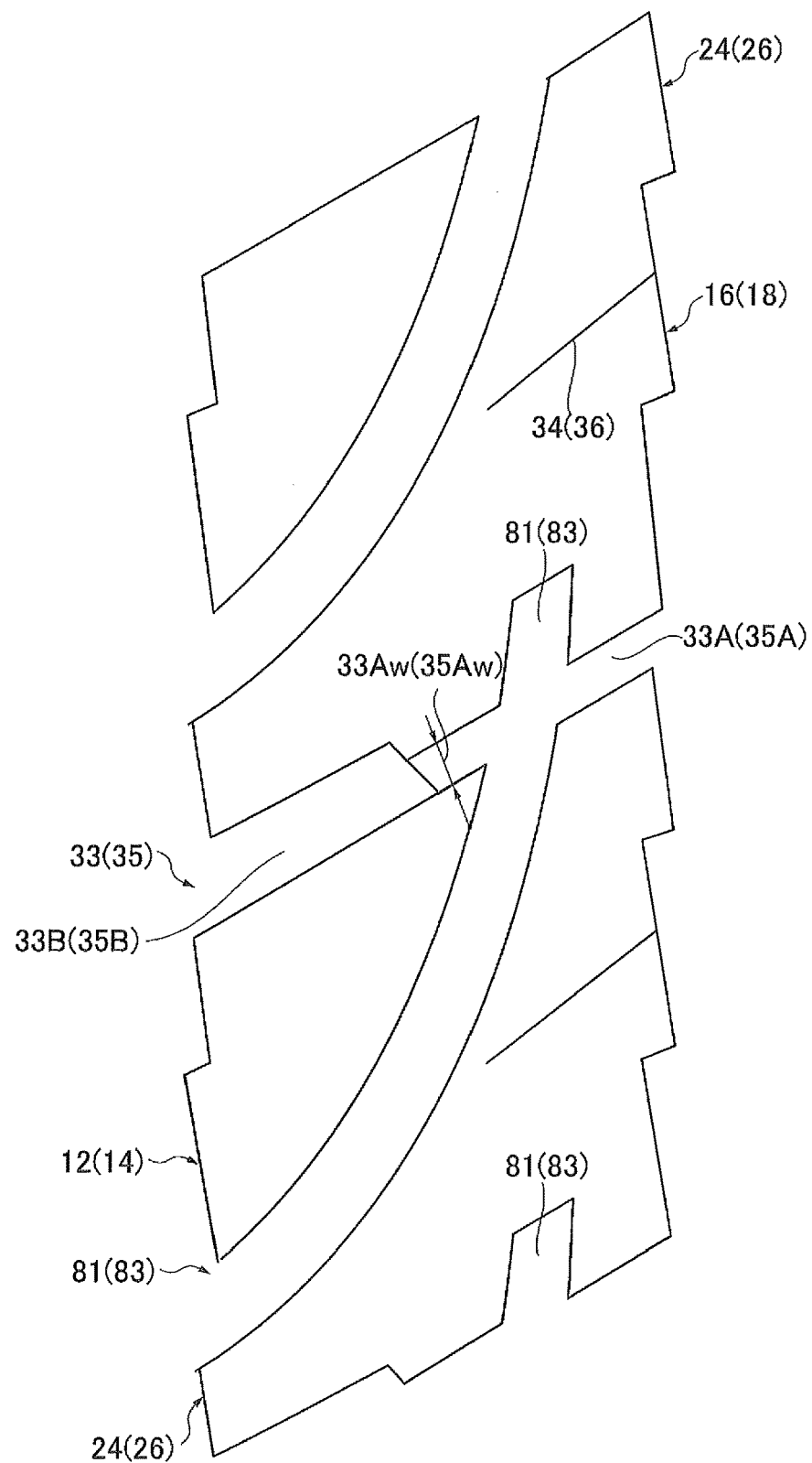
FIG. 7 is a magnified view of the tread pattern depicted in FIG. 3 focusing on land portion blocks in an intermediate land portion.

As illustrated in FIG. 7, each of the intermediate lug grooves 33, 35 includes inner regions 33A, 35A (first lug groove regions) constituting regions on the inner circumferential main grooves 15, 17 side, and outer regions 33B, 35B (second lug groove regions). The inner regions 33A, 35A are regions formed to the inside of the outer regions 33B, 35B with respect to the tire width direction, and lie along the direction in which the intermediate lug grooves 33, 35 extend on the outer circumferential main grooves 11, 13 side.

Figure 8:
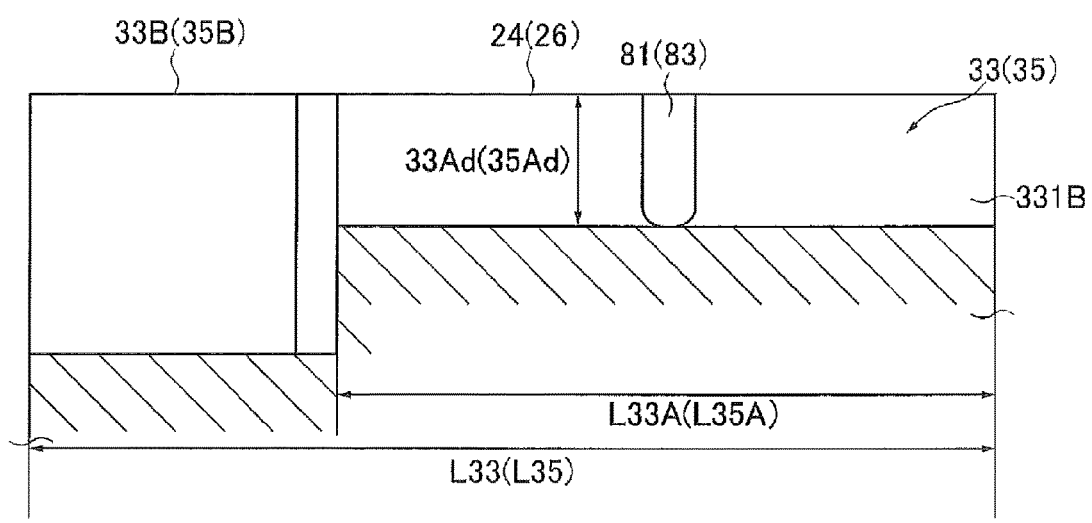
FIG. 8 is a cross-sectional view of the tread surface of the tire depicted in FIG. 1 as viewed from a direction of a line VII-VII (or VI-VI) in FIG. 3.

FIG. 7 is a magnified view of the tread pattern 10 focusing on intermediate land portion blocks 24, 26 of the intermediate land portions 23, 25. The reference numbers in parentheses in FIG. 7 are for elements related to the region of the intermediate land portion 25. When referring to the numbers in parentheses in FIG. 7, both sides of the tire circumferential direction are reversed from the numbers outside the parentheses. This also applies to FIGS. 9 to 11, described below. The inner regions 33A, 35A are formed so as to extend along a predetermined distance of the intermediate lug grooves 33, 35. As illustrated in FIG. 7, the inner regions 33A, 35A have groove widths 33Aw, 35Aw that are narrower than those of the outer regions 33B, 35B, and, as illustrated in FIG. 8, have groove depths 33Ad, 35Ad that are shallower than those of the outer regions 33B, 35B. FIG. 8 is a cross-sectional view of the tread surface of the tire 1 as viewed from a direction of line VII-VII (or VI-VI) in FIG. 3. The reference numbers in parentheses in FIG. 8 are for elements related to the region of the intermediate land portion 25.

The provision of the inner regions 33A, 35A to the inside of the intermediate lug grooves 33, 35 in this way ensures the rigidity of the intermediate land portions 23, 25, suppressing reductions in wear resistance on dry road surfaces, and ensures groove volume within the intermediate lug grooves 33, 35 necessary to improve water discharge performance and snow shear force, allowing for improved wet steering stability and steering stability on snow. In other words, it is thus to achieve a balance between wear resistance and wet steering stability and steering stability on snow. In particular, block rigidity can be considerably improved over cases in which projections formed by locally raising the groove bottoms of the intermediate lug grooves so as to be higher than other regions are formed in the inner regions 33A, 35A. The inner regions 33A, 35A are formed at regions along the length of the intermediate lug grooves 33, 35 on the inner circumferential main grooves 15, 17 side, and the outer regions 33B, 35B are formed on the outer side in the tire width direction of the inner regions 33A, 35A, thereby allowing for a high balance between wear resistance and wet steering stability and steering stability on snow.

The inner regions 33A, 35A are formed so as to connect with the inner circumferential main grooves 15, 17, and the outer regions 33B, 35B are connected with the inner regions 33A, 35A and the outer circumferential main grooves 11, 13. This allows the rigidity of the region of the tread portion 2 near the centerline CL to be increased and wear resistance to be improved while ensuring wet steering stability and steering stability on snow.

The lengths L33A, L35A of the inner regions 33A, 35A of the intermediate lug grooves 33, 35 is preferably from 30 to 80%, more preferably from 40 to 70%, of the groove lengths L33, L35 of the intermediate lug grooves 33, 35. Setting the lengths L33A, L35A of the inner regions 33A, 35A at or below the upper limit value of the range described above ensures sufficient groove volume in the intermediate lug grooves 33, 35, and setting the lengths at or above the lower limit value of the range described above ensures sufficient block rigidity in the intermediate land portions 23, 25. The groove lengths L33A, L35A of the inner regions 33A, 35A are, for example, 55% of the groove lengths L33, L35 of the intermediate lug grooves 33, 35.

The proportion of the groove lengths L33A, L35A of the inner regions 33A, 35A to the groove lengths L33, L35 of the intermediate lug grooves 33, 35 may be equal to or different from the proportion of the groove length L31A of the central region 31A to the groove length L31 of the center lug grooves 31. The groove lengths L33A, L35A of the inner regions 33A, 35A may have equal or different proportions to the groove lengths L33, L35 of the intermediate lug grooves 33, 35.

Arc-shaped grooves 81, 83 are preferably formed in the intermediate land portion blocks 24, 26 of the intermediate land portions 23, 25. The arc-shaped grooves 81, 83 extend in arc-shaped curves from the outer circumferential main grooves 11, 13 defining ends of the intermediate land portion blocks 24, 26 in the tire width direction to the intermediate lug grooves 33, 35 defining ends of the intermediate land portion blocks 24, 26 in the tire circumferential direction, and are formed so as to traverse the intermediate lug grooves 33, 35 and be closed off within another intermediate land portion block 24, 26 that is adjacent in the tire circumferential direction. The arc-shaped grooves 81, 83 comprise openings connected to the outer circumferential main grooves 11, 13, and closed ends that extend from the outer circumferential main grooves 11, 13 and are closed off within the adjacent intermediate land portion block 24, 26. Suitably disposing arc-shaped grooves 81, 83 as described above along with the intermediate lug grooves 33, 35 adjacent to the arc-shaped grooves 81, 83, the outer circumferential main grooves 11, 13, and the inner circumferential main grooves 15, 17 ensures steering stability. There is no particular limitation upon the groove depths of the arc-shaped grooves 81, 83; for example, the depth may be identical to the groove depths of the intermediate lug grooves 33, 35 at positions intersecting the intermediate lug grooves 33, 35.

As illustrated in FIG. 3, the intermediate lug grooves 33, 35 preferably extend obliquely with respect to the tire circumferential direction in a direction connecting the lower left side and the upper right side of FIG. 3. The oblique angle with respect to the tire circumferential direction is, for example, from 60 to 85° in the clockwise direction. Having the center lug grooves 31 be highly oblique with respect to the tire circumferential direction ensures the block rigidity of the intermediate land portions 23, 25, and improves wet steering stability and steering stability on snow at low steering angles while the vehicle is traveling. In addition, having the intermediate lug grooves 33, 35 be tilted in the opposite direction as the center lug grooves 31 ensures steering performance when turning left or right.

In the present embodiment, the elements in the region of the intermediate land portion 23 and the elements in the region of the intermediate land portion 25 are formed so as to be symmetrical with respect to a point on the tire centerline CL; however, they need not be symmetrically formed in other embodiments. The intermediate lug grooves 33, 35 may each extend in straight lines or in gentle curves.

(Center Sipes, Intermediate Sipes)

The tread pattern 10 preferably includes sipes extending in parallel to the center lug grooves 31 and the intermediate lug grooves 33, 35 in the center land portion blocks 22 and the intermediate land portion blocks 24, 26; more specifically, center sipes 30, 32 and intermediate sipes 34, 36. In the present specification, the term "sipe" refers to a groove having widths of less than 1.5 mm and groove depths of less than 7 mm. The term "lug groove" refers to a groove having a groove width of 1.5 mm or more and a groove depth of 7 mm or more. The intermediate sipes 34, 36 preferably extend in straight lines or curves.

As illustrated in FIG. 5, the center sipes 30, 32 in the region of the center land portion block 22 preferably extend across the tire centerline CL so as to connect the bend points 16a, 18a. This allows stress concentrated near the bend points 16a, 18a to be mitigated by the deformation of the sipes 32, 30, improving wear resistance.

Figure 9:
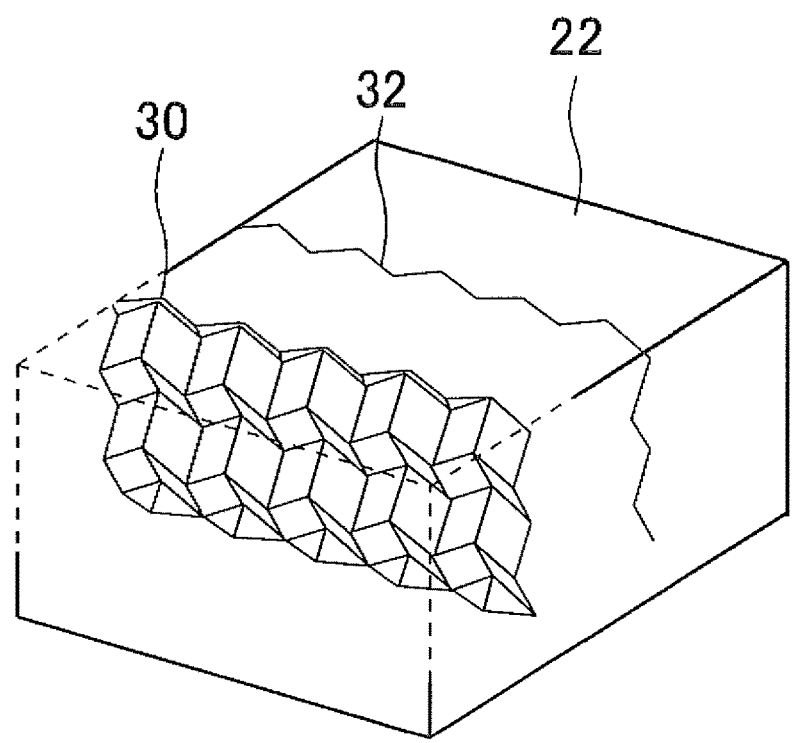
FIG. 9 is a view describing an example of the shape of the interior of a center land portion block at a center sipe in the tread pattern depicted in FIG. 3.

Two center sipes 30, 32 are formed in a single land portion block 22. The center sipes 30, 32 extend in parallel to the center lug grooves 31 forming the center land portion blocks 22, and connect the inner circumferential main grooves 15, 17. Two center sipes 30, 32 are provided in the center land portion blocks 22, but it is also acceptable to provide three or more. It is preferable for all of the center sipes 30, 32 to extend in wavy patterns formed by deviations in a direction orthogonal to the direction in which the center sipes 30, 32 extend, as illustrated in FIG. 5, and for the walls forming the center sipes 30, 32 to have raised-and-recessed surface portions that extend in a wavy pattern formed by deviation toward the bottom of the sipe, as illustrated in FIG. 9. FIG. 9 is an illustration of an example of the shape of the interiors of the center land portion blocks 22 at the center sipes 30, 32. Specifically, the sipe extends in a wavy pattern on the tread surface, and the walls of the sipe project outward or recess inward at at least two locations within the center land portion blocks 22 in the depth direction of the sipe, thereby forming peaks or valleys. These peaks or valleys form a series in the direction in which the sipe extends; this series forms a three-dimensional sipe that fluctuates in a wavelike shape in the radial direction of the tire (i.e., the depth direction of the sipe). The center sipes 30, 32 extend in straight lines at connecting portions at both ends of the sipes where they connect with the inner circumferential main grooves 15, 17, and form three-dimensional sipes at portions between the two connecting sections.

Adopting this three-dimensional sipe configuration allows the block rigidity of the center land portion blocks 22 to be increased, and allows collapsing of the center land portion blocks 22 when lateral forces or braking/driving forces are applied thereto to be suppressed. Collapse of the center land portion blocks 22 is especially great when lateral forces act thereupon if the center lug grooves 31 and the intermediate lug grooves 33, 35 have different oblique angles with respect to the tire circumferential direction. The form of the center land portion blocks 22 also greatly affects performance in snowy or wet conditions. On this point, it is preferable to increase block rigidity while maintaining the edge component of the center land portion blocks 22 in order to increase wet steering stability and steering stability on snow.

The two center sipes 30, 32 are disposed on different sides of the center of the center land portion block 22 with respect to the tire circumferential direction, and are preferably disposed so that the recessed portions of the wavy patterns face each other with respect to a line that passes through the center and is parallel to the center lug groove 31, and the raised portions of the wavy patterns face each other with respect to the line, i.e., so as to be symmetrical (linearly symmetrical) with respect to a line that passes through the center and is parallel to the center lug grooves 31. The center of the center land portion block 22 is the center of the shape of the center land portion block 22 when the tread surface of the center land portion blocks 22 is viewed from the outer side in the radial direction of the tire. Providing two sipes 30, 32 in this way causes the land portion block 22 to have uniform block rigidity along the tire circumferential direction, and improves uneven wear resistance when braking and driving. The wavy shapes of the sipes 32, 30 suppresses the formation of non-uniform ground contact pressure distributions when force is applied from a direction other than the direction in which the sipes 32, 30 extend and the land portion blocks 22 tend to collapse and deform, thereby suppressing reductions in ground contact area. The sipes 32, 30 may be formed so as to extend in a wavy pattern formed by deviations in the groove depth direction, or so as to extend in a straight line in the groove depth direction.

One intermediate sipe 34, 36 is formed in the intermediate land portions 23, 25 for each land portion block 24, 26. One end of the intermediate sipes 34, 36 is connected to the inner circumferential main grooves 15, 17, and the other end is closed off within the land portion blocks 24, 26 without being connected to the arc-shaped grooves 81, 83.

(Shoulder Land Portions)

The tread pattern 10 further comprises shoulder land portions 51, 53 at regions on the outer side in the tire width direction of the circumferential direction main groove group, as illustrated in FIG. 3. Shoulder lug grooves 61, 63 that extend from the outer side in the tire width direction toward one of the outer circumferential main grooves 11, 13 adjacent to the shoulder land portions 51, 53, i.e., inward in the tire width direction, are provided in the regions of the shoulder land portions 51, 53. The shoulder lug grooves 61, 63 are closed off part way through without connecting with the outer circumferential main grooves 11, 13. As a result, the shoulder land portions 51, 53 form continuous land portions 52, 54 that continuously extend in the tire circumferential direction. In the present specification, a land portion is referred to as a continuous land portion if the land portion is divided into a plurality of portions on the tread surface by sipes alone. Groove widths $61w$, $63w$ of the shoulder lug grooves 61, 63 are preferably broader than the broadest groove width of the groove width $31w$ of the outer regions 31B of the center lug grooves 31 and the groove widths $33w$, $35w$ of the outer regions 33B, 35B of the intermediate lug grooves 33, 35.

These shoulder lug grooves 61, 63 ensure groove volume while ensuring the block rigidity of the shoulder land portions 51, 53, thereby allowing for a balance between wear resistance and wet steering stability and steering stability on snow. For the sake of ensuring the block rigidity of the shoulder land portions 51, 53, the shoulder lug grooves 61, 63 preferably extend from an outer end in the tire width direction to a length that is at least 60%, more preferably from 70 to 80%, of the length of the ground contact regions of the shoulder land portions 51, 53 in the tire width direction. The groove widths $61w$, $63w$ of the shoulder lug grooves 61, 63 are, for example, from 100 to 180% of the groove widths $33w$, $35w$ of the outer regions 33B, 35B of the intermediate lug grooves 33, 35.

Figure 10:
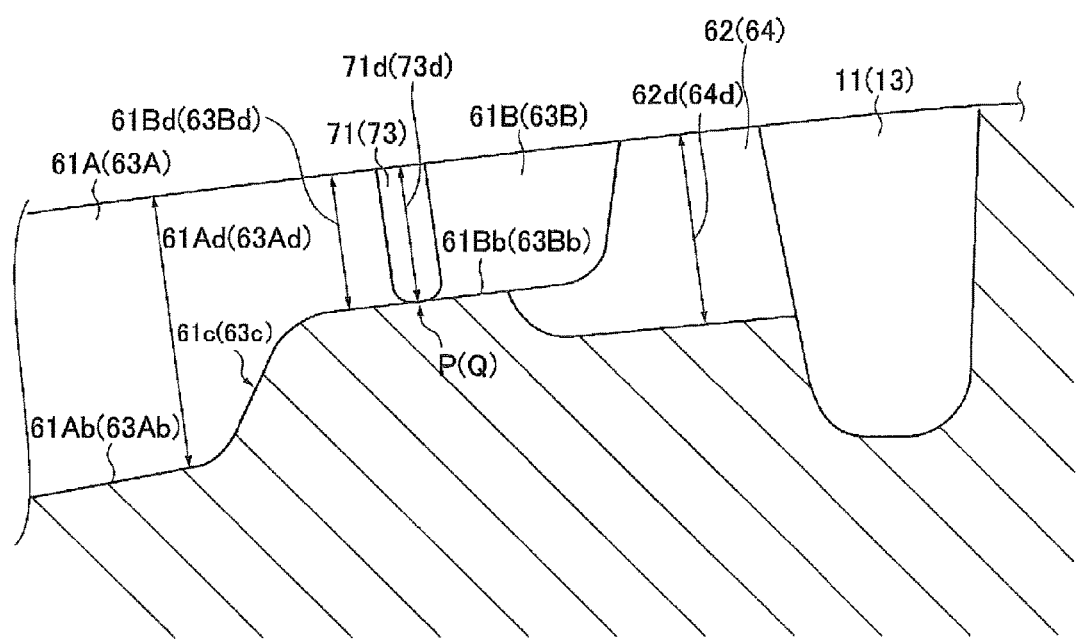
FIG. 10 is a cross-sectional view of the tread surface of the tire according to the present embodiment as viewed from a direction of a line VIII-VIII (or IX-IX) in FIG. 3.
Figure 11:
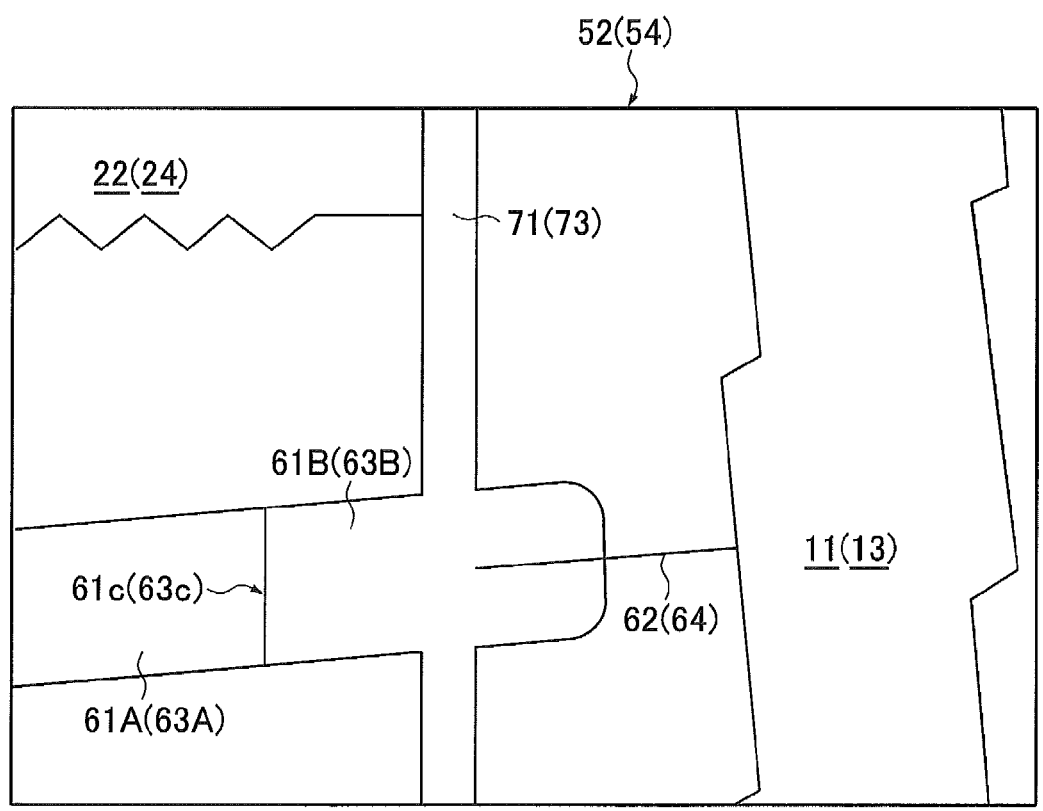
FIG. 11 is a magnified view of region A (or region B) depicted in FIG. 3.
Figure 12:
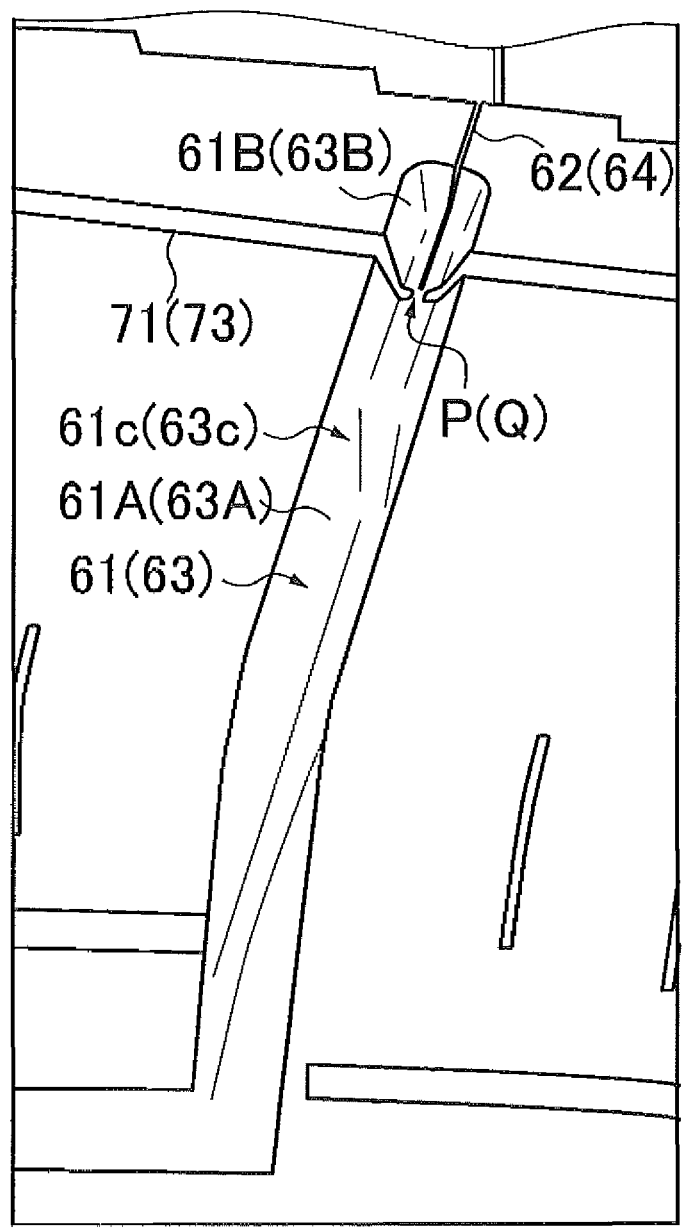
FIG. 12 is an external view of the tire depicted in FIG. 1 as viewed from the outer side in the tire width direction, focusing on a shoulder land portion region.

As illustrated in FIGS. 10 to 12, the shoulder lug grooves 61, 63 include outer regions 61A, 63A (first regions) that extend from an outer end in the tire width direction toward one of the outer circumferential main grooves 11, 13, i.e., inward in the tire width direction, and inner regions 61B, 63B (second regions) that connect with the outer regions 61A, 63A and extend to the ends of the shoulder lug grooves 61, 63 on the outer circumferential main grooves 11, 13 side, i.e., inner ends thereof in the tire width direction. FIG. 10 is a cross-sectional view of the tread surface of the tire as viewed from a direction of a line VIII-VIII (or line XI-XI) in FIG. 3. FIG. 11 is a magnified view of region A (or region B) illustrated in FIG. 3. FIG. 12 is an external view of the tire 1 from the outer side in the tire width direction, focusing on a region of the shoulder land portions 51, 53. The reference numbers in parentheses in FIGS. 10 to 12 are for elements related to the region of the shoulder land portion 53.

As illustrated in FIGS. 10 to 12, shoulder sipes 62, 64 that extend across the continuous land portions 52, 54 so as to connect the outer circumferential main grooves 11, 13 adjacent to the region of the shoulder land portions 51, 53 and the inner regions 61B, 63B of the shoulder lug grooves 61, 63 are formed in the region of the shoulder land portions 51, 53. The shoulder sipes 62, 64 preferably comprise the three-dimensional sipes described above, like the center sipes 30, 32. The three-dimensional sipes are preferably provided in ground contact regions of the shoulder land portions 51, 53. Specifically, the shoulder sipes 62, 64 are linearly extending sipes in connecting portions where the sipes connect with the outer circumferential main grooves 11, 13, as well as outside the ground contact regions of the shoulder land portions 51, 53 and near ground contact edges within these ground contact regions, and are three-dimensional sipes at portions between the connecting portions and the vicinities of the ground contact edges within the ground contact regions. Specifically, the shoulder sipes 62, 64 extend in a wavy pattern formed by deviations in a direction orthogonal to the direction in which the shoulder sipes extend, and wall surfaces forming the shoulder sipes 62, 64 comprise raised-and-recessed surface portions that extend in a wavy pattern formed by deviations toward the bottoms of the sipes. Providing shoulder sipes 62, 64 of this sort allow for the mitigation of the block rigidity of the continuous land portions 52, 54 in the tire width direction, while ensuring block rigidity under force acting in the tire circumferential direction, unlike the lug grooves. The shoulder sipes 62, 64 are capable of taking snow into the sipes to improve snow shear force, thereby allowing for increased steering stability on snow.

It is preferable that the groove depths 61Bd, 63Bd of the inner regions 61B, 63B be shallower than the groove depths 61Ad, 63Ad of the outer regions 61A, 63A, and that the groove depths $62d$, $64d$ of the shoulder sipes 62, 64 be deeper than the groove depths 61Bd, 63Bd of the inner regions 61B, 63B of the shoulder lug grooves 61, 63, as illustrated in FIG. 10. This ensures the block rigidity of the shoulder land portions 51, 53, sufficiently mitigates the block rigidity of the continuous land portions 52, 54 in the tire width direction, and ensures steering stability.

Groove bottom portions 61Bb, 63Bb of the inner regions 61B, 63B of the shoulder lug grooves 61, 63 are preferably raised to form gradients $61c$, $63c$ with respect to groove bottom portions 61Ab, 63Ab of the outer regions 61A, 63A, as illustrated in FIGS. 10 and 12. In the present specification, the term "gradient" does not include aspects in which the groove depths 61Ad, 63Ad of the outer regions 61A, 63A become gradually shallower toward the ends on the outer circumferential main grooves 11, 13 side until reaching the continuous land portions 52, 54. Providing gradients $61c$, $63c$ of this sort increases the block rigidity of the shoulder land portions 51, 53, ensuring steering stability.

The outer ends of the shoulder sipes 62, 64 in the tire width direction are preferably formed so as to penetrate into the groove bottoms of the inner regions 61B, 63B of the shoulder lug grooves, as illustrated in FIGS. 10 to 12. This sufficiently mitigates the block rigidity of the continuous land portions 52, 54 in the tire width direction, ensuring steering stability.

As illustrated in FIGS. 10 to 12, narrow circumferential grooves 71, 73 that extend in the tire circumferential direction and have groove widths $71w$, $73w$ that are narrower than groove widths $61w$, $63w$ of the shoulder lug grooves 61, 63 are formed in the regions of the shoulder land portions 51, 53. It is preferable for the groove depths $71d$, $73d$ of the narrow circumferential grooves 71, 73 to be shallower than the groove depths 61Ad, 63Ad (maximum groove depths) of the outer regions 61A, 63A of the shoulder lug grooves 61, 63, and for the narrow circumferential grooves 71, 73 to intersect with the shoulder lug grooves 61, 63 on the adjacent outer circumferential main grooves 11, 13 side, i.e., inner sides in the tire width direction with respect to centers in the tire width direction of tire ground contact regions of the shoulder land portions 51, 53 within a ground contact width $11w$ of the tire. The center of the ground contact region of the shoulder land portions 51, 53 in the tire width direction is a middle point on a straight line drawn parallel to the tire width direction that connects a position on an outer end of the tire ground contact width $11w$ in the tire width direction and a position of the main groove walls 12, 14 adjacent to the shoulder land portions 51, 53 on the outermost side in the tire width direction.

Providing narrow circumferential grooves 71, 73 of this sort ensures wet steering stability and steering stability on snow, and sufficiently ensures the block rigidity of the shoulder land portions 51, 53 due to the groove widths $71w$, $73w$ of the narrow circumferential grooves 71, 73 being narrower than the groove widths $61w$, $63w$ of the shoulder lug grooves 61, 63. The shallowness of the groove depths $71d$, $73d$ of the narrow circumferential grooves 71, 73 allows reductions in the block rigidity of the shoulder land portions 51, 53 to be suppressed. In addition, the intersection of the narrow circumferential grooves 71, 73 with the shoulder lug grooves 61, 63 on the outer circumferential main grooves 11, 13 side, i.e., on the inner sides in the tire width direction with respect to centers of tire ground contact regions of the shoulder land portions 51, 53 within a ground contact width 11w of the tire, allows for a balance between wear resistance and wet steering stability and steering stability on snow.

The shoulder lug grooves 61, 63 preferably have groove depths 61Bd, 63Bd equal to those of the narrow circumferential grooves 71, 73 at positions P, Q where the lug grooves intersect with the narrow circumferential grooves 71, 73. As a result, block rigidity is made appropriate.

The shoulder lug grooves 61, 63 preferably extend obliquely with respect to the tire circumferential direction. For example, the grooves have angles of 75 to 90° with respect to the tire circumferential direction. Imparting the center lug grooves 31, 33, 35 and shoulder lug grooves 61, 63 with different respective oblique angles yields a variety of oblique angles on the tread surface, thereby yielding superior steering stability when steering at small and medium steering angles while the vehicle is traveling.

Examples of other dimensions of the elements of the tire 1 described above will be provided below.

The central regions 31A of the center lug grooves 31 and the inner regions 33A, 35A of the intermediate lug grooves 33, 35 may be identical or different, and have groove widths of 1.5 to 7 mm and groove depths of 2 to 6 mm. The outer regions 31B of the center lug grooves 31 and the outer regions 33B, 35B of the intermediate lug grooves 33, 35 may be identical or different, and have groove widths of 2 to 8 mm and groove depths of 4 to 12 mm.

The central regions 31A of the center lug grooves 31 and the inner regions 33A, 35A of the intermediate lug grooves 33, 35 have identical or different groove lengths of 6 to 25 mm. The outer regions 31B of the center lug grooves 31 and the outer regions 33B, 35B of the intermediate lug grooves 33, 35 have identical or different groove lengths of 5 to 25 mm.

The shoulder lug grooves 61, 63 have identical or different groove widths of 2 to 12 mm.

The inner regions 61B, 63B of the shoulder lug grooves 61, 63 have identical or different groove depths of 2 to 6 mm. The outer regions 61A, 63A of the shoulder lug grooves 61, 63 have identical or different groove depths of 4 to 12 mm. The shoulder sipes 62, 64 have identical or different groove depths of 2 to 10 mm.

The narrow circumferential grooves 71, 73 may be identical or different, and have groove widths of 1.5 to 4 mm and groove depths of 2 to 6 mm. The shoulder lug grooves 61, 63 have identical or different groove widths of 2 to 10 mm.

The ground contact width of the tire is from 130 to 230 mm. The ground contact regions of the shoulder land portions 51, 53 may have identical or different lengths of 25 to 45 mm in the tire width direction.

To summarize the effects of the pneumatic tire 1 according to the present embodiment described above, one groove wall out of the main groove walls 16, 18 of the inner circumferential main grooves 15, 17 is a first groove wall W1 including first oblique wall elements W1a and second oblique wall elements W1b, and another groove wall facing the first groove wall is a second groove wall W2 including third oblique wall elements W2a and fourth oblique wall elements W2b. This allows for portions in which the groove width of the inner circumferential main grooves 15, 17 is made narrower by virtue of the first oblique wall elements W1a and the third oblique wall elements W2a. This portion of reduced groove width can be used to compact snow entering the inner circumferential main grooves 15, 17 when driving on snowy roads to form hard clumps of snow. This increases snow shear force, allowing for increased steering stability on snow. It is thus possible to achieve a balance between wear resistance and wet steering stability and steering stability on snow.

At least parts of the center sipes 30, 32 are three-dimensional sipes, thereby allowing collapsing of the center land portion blocks 22 when lateral forces or braking/driving forces are applied thereto to be suppressed. In addition, at least parts of the shoulder sipes 62, 64 are three-dimensional sipes, thereby allowing collapsing of the region of the land portion between adjacent shoulder lug grooves 61, 63 when lateral forces or braking is applies thereto to be suppressed.

In addition, the formation of narrow first lug groove regions having raised bottoms in one of the center lug grooves 31 in the region of the center land portion 21 and the intermediate lug grooves 33, 35 in the regions of the intermediate land portions 23, 25 suppresses reductions in the block rigidity of center land portions 21 and intermediate land portions 23, 25 that are adjacent in the tire circumferential direction, allowing for ensured wear resistance on dry road surfaces, and ensures the groove volume of the center lug grooves 31, 33, 35, allowing for ensured wet steering stability and steering stability on snow. This allows for a balance between wear resistance and wet steering stability and steering stability on snow.

Other Embodiments

The lug grooves including the first lug groove regions and the second lug groove regions may be formed in at least one of the center land portion 21, the intermediate land portion 23, and the intermediate land portion 25.

The first lug groove regions of the center lug grooves 31 traverse the tire centerline CL, and one end thereof in the tire width direction may be connected to one of the main grooves. The first lug groove regions of the center lug grooves 31 need not traverse the tire centerline CL. For example, an arrangement in which the first lug groove regions are provided on one side of the tire centerline CL in the tire width direction and the second lug groove region traverse the tire centerline CL is acceptable. Alternatively, the first lug groove regions may be provided on both sides of the tire centerline CL, with second lug groove regions being provided between the two first lug groove regions.

In the intermediate lug grooves 33, 35, the first lug groove regions may be formed in an outer region connected to the outer circumferential main groove, and the second lug groove regions may be formed on the inner side of the first lug groove region in the tire width direction, i.e., in inner regions connecting to the first lug groove regions and the inner circumferential main grooves. The arc-shaped grooves may be provided in only one of the two intermediate land portions, or may be provided in both.

The number of circumferential main grooves is not limited to four; there may be five or more.

Sipes need not be provided in the center land portion blocks 22 and the intermediate land portion blocks 24, 26. The center sipes 30, 32 of the center land portion blocks 22 need not extend across so as to connect the bend points 16a, 18a.

There may be one center sipe 30, 32 or three or more thereof in one land portion block. If there is an even number of center sipes in a single center land portion block 22, the sipes are preferably divided into two equal groups and provided facing each other over the center of the center land portion block 22. If there is an even number of center sipes, the sipes need not be formed facing each other over the center of the tread surface. The center sipe need not extend in a wavy pattern formed by deviations in a direction orthogonal to the direction in which the sipes extend. The center sipes may be closed off within the center land portion 21 without connecting with the inner circumferential main groove. The intermediate sipes 34, 36 may connect with the arc-shaped grooves or the outer circumferential main grooves. The tread pattern may not have the sipes.

The shoulder lug grooves 61, 63 may connect with outer circumferential main grooves adjacent to the shoulder land portions 51, 53, and continuous land portions 52, 54 need not be formed. The groove widths of the shoulder lug grooves 61, 63 may be equal to or narrower than the maximum groove width of the lug grooves. The shoulder lug grooves 61, 63 need not comprise inner regions having shallower groove depths. The shoulder lug grooves 61, 63 need not be provided in the region of the shoulder land portions 51, 53. The shoulder sipes 62, 64 need not be present in the region of the shoulder land portions. The groove depths of the shoulder sipes 62, 64 may be equal to or shallower than the groove depths of the inner regions of the shoulder lug grooves 61, 63.

The groove bottom portions of the inner regions of the shoulder lug grooves 61, 63 need not be raised to form a gradient so as to be higher than the groove bottom portions of the outer regions. The outer ends of the shoulder sipes 62, 64 in the tire width direction need not be formed so as to penetrate into the groove bottoms in the inner regions of the shoulder lug grooves. The shoulder lug grooves 61, 63 may be connected to the outer circumferential main grooves 11, 13, thereby forming a plurality of land portion blocks in the tire circumferential direction.

EXAMPLES

Test tires were produced to study the effects of the tread pattern 10 of the tire 1 of the present technology.

The tire size was P265/70R17 113T. Using 17×7.5 J rims, tires provided with tread patterns having the specifications shown in Tables 1 to 2 below were produced.

The groove width of each of the circumferential main grooves was 8 mm. The center in the tire width direction of the region of the ground contact width in which the shoulder land portions contact the ground was set at 15 mm from the adjacent outer circumferential main grooves. The proportion of the groove lengths of the central regions of the center lug grooves to the groove lengths of the lug groove was set at 55%. The tread patterns of the examples were similar to the tread pattern illustrated in FIG. 3.

An FF vehicle with an engine displacement of 2 liters was used as a vehicle for studying tire performance. The inner pressure of all of the front wheels and the rear wheels was set to 210 kPa.

The performance of the tire was evaluated as follows for wet steering stability, steering stability on snow, and wear resistance. Evaluation results are shown in Tables 1 and 2.

In the tables, arrow marks "←" indicate ditto marks for the field to which the arrow points. In Tables 1 and 2, "same oblique direction" in the row "Inner circumferential main groove groove wall shape" indicates that two facing groove walls are both first groove walls W1 or second groove walls W2, and "different oblique directions" indicates that the facing groove walls are a set of a first groove wall W1 and a second groove wall W2, as illustrated in FIGS. 4A and 4B.

If the center sipes and shoulder sipe are "three-dimensional sipes" in the "Three-dimensional sipe or ordinary sipe?" row, the sipes extend in a wavy pattern on the tread surface and have wall surfaces that extend in the sipe depth direction in a raised-and-recessed pattern toward the bottom of the sipe; if the sipes are "ordinary sipes", the sipes extend in a wavy pattern on the tread surface but do not have wall surfaces that extend in the sipe depth direction in a raised-and-recessed pattern toward the bottom of the sipe. The center lug grooves are oblique in the counterclockwise direction with respect to the tire circumferential direction. If the oblique direction of the intermediate lug grooves is the counterclockwise direction with respect to the tire circumferential direction, the center lug grooves are "identical"; if the direction is the clockwise direction with respect to the tire circumferential direction, the center lug grooves are "opposite". The "Disposal of center land portion sipes" row indicates whether the plurality of sipes in the center land portion is symmetrical or asymmetrical with respect to a line that is parallel to a line that passes through the center of the center land portion and is parallel to the center lug groove. If "symmetrical", the recessed portions of the wavy pattern of the sipes face each other, and the raised portions of the wavy pattern of the sipes face each other. "Position of narrow circumferential grooves in tire width direction" indicates the distance of the position where the narrow circumferential grooves and the shoulder lug grooves intersect from the centers in the tire width direction of ground contact regions of shoulder land portions within a ground contact width of the tire toward the adjacent outer circumferential main groove.

(Wet Steering Stability)

Average lateral acceleration was measured for 5 laps at a maximum speed on a 30 m-radius curved course of an outdoor tire testing facility having a wet road surface with a water depth of 1 mm. The evaluation was carried out by taking the inverse of the measurement values and expressing the inverse of the measurement values of the tire of the Conventional Example as 100. Larger index values indicate superior wet steering stability.

(Steering Stability on Snow)

Measurement was performed in a manner similar to the procedure for wet steering stability described above, except that a snow-covered road surface was driven on instead of a wet road surface having a water depth of 1 mm. The evaluation was carried out by taking the inverse of the measurement values and expressing the inverse of the measurement values of the tire of the Conventional Example as 100. Larger index values indicate superior steering stability on snow.

(Wear Resistance)

Wear after traveling 20,000 km on public roads on dry road surface was measured. The evaluation was carried out by taking the inverse of the measurement values and expressing the inverse of the measurement values of the tire of the Conventional Example as 100. Larger index values indicate superior wear resistance.

If the evaluation index for wear resistance is 100 or higher, and the total value of the evaluation indexes for steering stability on snow, wet steering stability, and wear resistance is 304 or higher, wear resistance and steering stability on snow.

TABLE 1

| | Conventional Example | Comparative Example 1 | Working Example 1 | Working Example 2 | Working Example 3 |
|---|---|---|---|---|---|
| Center lug groove oblique angle/average groove width (mm) | 90°/5 | 70°/5 | 70°/5 | ← | ← |
| Intermediate lug groove oblique angle/average groove width (mm) | 90°/5 | 70°/5 | 70°/5 | ← | ← |
| Shoulder lug groove oblique angle/average groove width (mm) | 90°/5 | 85°/5 | 85°/5 | ← | ← |
| Movement in oblique direction of center lug grooves and intermediate lug grooves with respect to the tire circumferential direction | Same | Opposite | Opposite | ← | ← |
| Shape of groove walls of inner circumferential main groove | Straight lines | Zigzag shapes, same oblique direction | Zigzag shapes, different oblique direction | ← | ← |
| Shape of groove walls of outer circumferential main groove | Straight lines | Zigzag shapes, same oblique direction | Zigzag shapes, same oblique direction | ← | ← |
| Groove width of center lug grooves (center (mm)/outer (mm)) | 5/5 | 3/7 | 3/7 | ← | ← |
| Groove depth of center lug grooves (center (mm)/outer (mm)) | 7/7 | 4/10 | 4/10 | ← | ← |
| Groove width of intermediate lug grooves (center (mm)/outer (mm)) | 5/5 | 3/7 | 3/7 | ← | ← |
| Groove depth of intermediate lug grooves (center (mm)/outer (mm)) | 7/7 | 4/10 | 4/10 | ← | ← |
| Number of center sipes/position of center sipes on main groove wall | 0 | 2/between bend points | 2/between bend points | ← | ← |
| Center sipes three-dimensional sipes or ordinary sipes? | Ordinary sipes | ← | Ordinary sipes | Three-dimensional sipes | ← |
| Shoulder sipes three-dimensional sipes or ordinary sipes? | Ordinary sipes | ← | Ordinary sipes | Three-dimensional sipes | ← |
| Disposition of center sipes | — | Asymmetric | Asymmetric | ← | Symmetric |
| Groove depth (circumferential main groove (mm)/shoulder lug groove (mm)/narrow circumferential groove(mm)) | 11/11/none | ← | 11/11/none | ← | ← |
| Position of narrow circumferential grooves in tire width direction (mm) | 0 | ← | | | |
| Steering stability on snow | 100 | 101 | | | |
| Wet steering stability | 100 | 101 | | | |
| Wear resistance | 100 | 100 | | | |

TABLE 1-continued

| | | | |
|---|---|---|---|
| Position of narrow circumferential grooves in tire width direction (mm) | 0 | ← | ← |
| Steering stability on snow | 103 | 105 | 105 |
| Wet steering stability | 103 | 105 | 105 |
| Wear resistance | 101 | 101 | 103 |

TABLE 2

| | Working Example 4 | Working Example 5 | Working Example 6 |
|---|---|---|---|
| Center lug groove oblique angle/average groove width (mm) | 70°/5 | 70°/4 | ← |
| Intermediate lug groove oblique angle/average groove width (mm) | 70°/5 | 70°/4 | ← |
| Shoulder lug groove oblique angle/average groove width (mm) | 85°/5 | 85°/6 | ← |
| Movement in oblique direction of center lug grooves and intermediate lug grooves with respect to the tire circumferential direction | Opposite | ← | ← |
| Shape of groove walls of inner circumferential main groove | Zigzag lines, different oblique direction | ← | ← |
| Shape of groove walls of outer circumferential main groove | Zigzag lines, same oblique direction | ← | ← |
| Groove width of center lug grooves (center (mm)/outer (mm)) | 3/7 | ← | ← |
| Groove depth of center lug grooves (center (mm)/outer (mm)) | 4/10 | ← | ← |
| Groove width of intermediate lug grooves (center (mm)/outer (mm)) | 3/7 | ← | ← |
| Groove depth of intermediate lug grooves (center (mm)/outer (mm)) | 4/10 | ← | ← |
| Number of center sipes/position of center sipes on main groove wall | 2/bend points | ← | ← |
| Center sipes three-dimensional sipes or ordinary sipes? | Three-dimensional sipes | ← | ← |
| Shoulder sipes three-dimensional sipes or ordinary sipes? | Three-dimensional sipes | ← | ← |
| Disposition of center sipes | Symmetric | ← | ← |
| Groove depth (circumferential main groove (mm)/shoulder lug groove (mm)/narrow circumferential groove(mm)) | 11/11/None | ← | 11/10/5 |
| Position of narrow circumferential grooves in tire width direction (mm) | 0 | ← | 4 |
| Steering stability on snow | 105 | 107 | 109 |
| Wet steering stability | 105 | 107 | 109 |
| Wear resistance | 104 | 106 | 105 |

A comparison of Working Example 3 in Table 1 and Working Example 4 in Table 2 shows that wear resistance improved when two center sipes were formed so as to connect the bend points of the main groove walls. A high balance between wear resistance, steering stability on snow, and wet steering stability was obtained when the groove width of the shoulder lug grooves was greater than the groove widths of the center lug grooves and the intermediate lug grooves (Working Examples 5 and 6). Wear resistance was improved and steering stability on snow and wet steering stability were vastly superior when narrow circumferential grooves were present, the grooves having a groove depth less than that of the outer circumferential main grooves and the shoulder lug grooves and intersecting with the shoulder lug grooves on the outer circumferential main groove side with respect to centers in the tire width direction of ground contact regions of the shoulder land portions within a ground contact width of the tire (the ground contact width of the shoulder land portion region) (Working Example 6).

The foregoing has been a detailed description of the pneumatic tire of the present technology. However, the present technology is naturally not limited to the above embodiments, but may be improved or modified in various ways within the scope of the present technology.

What is claimed is:

1. A pneumatic tire comprising a tread pattern formed in a tread portion,
   the tread pattern including:
   a circumferential direction main groove group constituted by four circumferential main grooves parallel to a tire circumferential direction, including two outer circumferential main grooves disposed on an outer side in a tire width direction and two inner circumferential main grooves disposed between the outer circumferential main grooves, a centerline of the tire passing between the inner circumferential main grooves;
   a plurality of center lug grooves that traverse a region of a center land portion defined by the two inner circumferential main grooves, the center land portion through which the centerline of the tire passes, and form a plurality of center land portion blocks in the region of the center land portion; and
   a plurality of intermediate lug grooves that traverse regions of two intermediate land portions defined by the outer circumferential main grooves and the inner circumferential main grooves, and form a plurality of intermediate land portion blocks in the regions of the intermediate land portions;
   a pair of groove walls facing each other of each of the two inner circumferential main grooves consists of a first groove wall as one groove wall of the pair of groove walls and a second groove wall as the other groove wall of the pair of groove walls;
   a pair of groove walls facing each other of each of the two outer circumferential main grooves is a pair of the first groove walls or a pair of the second groove walls;
   the first groove wall is made up of a plurality of first oblique wall elements that extend obliquely outward in the tire width direction from a first direction in the tire circumferential direction and a plurality of second oblique wall elements that extend obliquely inward in the tire width direction from the first direction and extend for a shorter length than the first oblique wall elements, and for each of the inner circumferential main grooves the first oblique wall elements and the second oblique wall elements are connected alternately in the tire circumferential direction at each of the land portion blocks with which the first groove wall contacts; and
   the second groove wall is made up of a plurality of third oblique wall elements that extend obliquely inward in the tire width direction from the first direction and a plurality of fourth oblique wall elements that extend obliquely outward in the tire width direction from the first direction and extend for a shorter length than the third oblique wall elements, and for each of the inner circumferential main grooves the third oblique wall elements and the fourth oblique wall elements are connected alternately in the tire circumferential direction at each of the land portion blocks with which the second groove wall contacts.

2. The pneumatic tire according to claim 1, wherein the first groove wall and the second groove wall of each of the two inner circumferential main grooves are disposed so that two of groove walls of the inner circumferential main grooves contacting the center land portion blocks form a combination of the first groove wall and the second groove wall.

3. The pneumatic tire according to claim 1, wherein the first oblique wall elements and the third oblique wall elements of each of the inner circumferential main grooves are disposed at offset positions in the tire circumferential direction.

4. The pneumatic tire according to claim 1, wherein the center land portion blocks positioned in the center land portion are each provided with at least two center sipes that extend in parallel with the center lug grooves that form the center land portion blocks and connect the two inner circumferential main grooves, each of the center sipes extending in a wavy pattern formed by deviations in a direction orthogonal to a center sipe extension direction, and wall surfaces forming the center sipe comprise raised-and-recessed surface portions extending in a wavy pattern formed by deviations toward a bottom of the sipe.

5. The pneumatic tire according to claim 4, wherein two center sipes are provided per each of the center land portion blocks, the two center sipes being provided to different sides of the center of the center land portion block with respect to the tire circumferential direction; and
recessed portions of the wavy patterns of the two center sipes face each other with respect to a line that passes through the center and is parallel to the center lug groove, and raised portions of the wavy patterns of the two center sipes face each other with respect to the line.

6. The pneumatic tire according to claim 1, wherein the intermediate land portion blocks constituted by land portion blocks in the regions of the intermediate land portions are provided with intermediate sipes that are parallel with the intermediate lug grooves that traverse the regions of the intermediate land portions;
shoulder land portions are provided in a region on the outer side in the tire width direction of the circumferential direction main groove group;
the shoulder land portions are provided with shoulder sipes,
the intermediate sipes are sipes that extend in straight or curved lines; and
each of the shoulder sipes comprises a portion that extends in a wavy pattern formed by deviations in a direction orthogonal to the direction in which the shoulder sipe extends, and wall surfaces forming the shoulder sipe comprise a raised-and-recessed surface portion that extends in a wavy pattern formed by deviations toward a bottom of the sipe.

7. The pneumatic tire according to claim 1, wherein shoulder land portions are provided in a region on the outer side in the tire width direction of the circumferential direction main groove group;
each of the shoulder land portions is provided with a shoulder lug groove that extends from an outer side in the tire width direction toward one of the outer circumferential main grooves, the shoulder lug groove being closed off along a middle thereof without connecting with either of the outer circumferential main grooves so that the shoulder land portion forms a substantially continuous land portion that substantially continuously extends in the tire circumferential direction; and
the shoulder lug grooves have a groove width that is greater than a maximum groove width of the center lug grooves and the intermediate lug grooves.

8. The pneumatic tire according to claim 7, wherein the shoulder lug grooves comprise a first region that extends from an outer end in the tire width direction toward one of the outer circumferential main grooves and a second region that connects with the first region and extends to a closed end of the shoulder lug groove, the second region having a groove depth that is less than that of the first region;
a shoulder sipe extending across the substantially continuous land portion so as to connect to one of the outer circumferential main grooves and the second region of the shoulder lug groove is formed in the regions of the shoulder land portions; and
the shoulder sipes have a groove depth that is deeper than that of the second regions of the shoulder lug grooves.

9. The pneumatic tire according to claim 8, wherein groove bottom portions in the second regions of the shoulder lug grooves are raised to form gradients so as to be higher than groove bottom portions in the first regions.

10. The pneumatic tire according to claim 7, wherein narrow circumferential grooves that extend in the tire circumferential direction and have narrower groove widths than the shoulder lug grooves are provided in the shoulder land portions;
the narrow circumferential grooves have groove depths that are less than maximum groove depths of the shoulder lug grooves; and
the narrow circumferential grooves intersect with the shoulder lug grooves on inner sides in the tire width direction with respect to centers in the tire width direction of ground contact regions of the shoulder land portions within a ground contact width of the tire.

11. The pneumatic tire according to claim 10, wherein the groove depth of the shoulder lug grooves is equal to that of the narrow circumferential grooves at a position where the shoulder lug grooves intersect with the narrow circumferential grooves.

12. The pneumatic tire according to claim 1, wherein arc-shaped grooves that extend in a curving arc so as to connect with the outer circumferential main grooves defining the intermediate land portion blocks of the intermediate land portions and the intermediate lug grooves defining the intermediate land portion blocks are formed in the intermediate land portion blocks of the intermediate land portions.

13. The pneumatic tire according to claim 1, wherein at least one of the center lug grooves provided in the center land portion region or the intermediate lug grooves provided in the intermediate land portion region includes a first lug groove region and a second lug groove region that is connected to the first lug groove region, the first lug groove region having a narrower groove width than the second lug groove region and a shallower groove depth than the second lug groove region.

14. The pneumatic tire according to claim 13, wherein center lug grooves each including the first lug groove region and the second lug groove region are formed in the center land portion region, the first lug groove region being formed in a central region of the center lug groove in the direction in which the center lug groove extends, the central region traversing the centerline, and the second lug groove region being formed on the outer side in the tire width direction of the central region.

15. The pneumatic tire according to claim 13, wherein intermediate lug grooves each including the first lug groove region and the second lug groove region are formed in regions of the intermediate land portions, the first lug groove region being formed on an inner side in the tire width direction of the second lug groove region.

16. The pneumatic tire according to claim 1, wherein the outer circumferential main grooves maintain a constant groove width.

17. The pneumatic tire according to claim 1, wherein:
the lug grooves of the intermediate land portions incline in a same direction with respect to the circumferential direction and are parallel; and
a sign of an angle of inclination of the lug grooves of the intermediate land portions is opposite a sign of an angle of inclination of the lug grooves of the center land portion.

18. The pneumatic tire according to claim 1, wherein:
the second groove walls are on sides of the center land portion,
the first groove walls are on the intermediate land portions,
the first oblique wall elements of the first groove walls are parallel to one another,
the second oblique wall elements of the first groove walls are parallel to one another,
the third oblique wall elements of the second groove walls are parallel to one another, and
the fourth oblique wall elements of the second groove walls are parallel to one another.

19. A pneumatic tire comprising a tread pattern formed in a tread portion,
the tread pattern including:
a circumferential direction main groove group constituted by four circumferential main grooves parallel to a tire circumferential direction, including two outer circumferential main grooves disposed on an outer side in a tire width direction and two inner circumferential main grooves disposed between the outer circumferential main grooves, a centerline of the tire passing between the inner circumferential main grooves;
a plurality of center lug grooves that traverse a region of a center land portion defined by the two inner circumferential main grooves, the center land portion through which the centerline of the tire passes, and form a plurality of center land portion blocks in the region of the center land portion; and
a plurality of intermediate lug grooves that traverse regions of two intermediate land portions defined by the outer circumferential main grooves and the inner circumferential main grooves, and form a plurality of intermediate land portion blocks in the regions of the intermediate land portions;
each of the two inner circumferential main grooves comprises a first groove wall and a second groove wall facing the first groove wall;
the first groove wall comprises a first oblique wall element that extends obliquely outward in the tire width direction from a first direction in the tire circumferential direction and a second oblique wall element that extends obliquely inward in the tire width direction from the first direction and extends for a shorter length than the first oblique wall element, the first groove wall being made up of a plurality of sets of first oblique wall elements and second oblique wall elements; and
the second groove wall comprises a third oblique wall element that extends obliquely inward in the tire width direction from the first direction and a fourth oblique wall element that extends obliquely outward in the tire width direction from the first direction and extends for a shorter length than the third oblique wall element, the second groove wall being made up of a plurality of sets of third oblique wall elements and fourth oblique wall elements; wherein
shoulder land portions are provided in a region on the outer side in the tire width direction of the circumferential direction main groove group;
each of the shoulder land portions is provided with a shoulder lug groove that extends from an outer side in the tire width direction toward one of the outer circumferential main grooves, the shoulder lug groove being closed off along a middle thereof without connecting with either of the outer circumferential main grooves so that the shoulder land portion forms a substantially continuous land portion that substantially continuously extends in the tire circumferential direction;
the shoulder lug grooves have a groove width that is greater than a maximum groove width of the center lug grooves and intermediate lug grooves;
the shoulder lug grooves comprise a first region that extends from an outer end in the tire width direction toward one of the outer circumferential main grooves and a second region that connects with the first region and extends to a closed end of the shoulder lug groove, the second region having a groove depth that is less than that of the first region;
a shoulder sipe extending across the substantially continuous land portion so as to connect to one of the outer circumferential main grooves and the second region of the shoulder lug groove is formed in the regions of the shoulder land portions;
the shoulder sipes have a groove depth that is deeper than that of the second regions of the shoulder lug grooves; and
outer ends of the shoulder sipes in the tire width direction are formed so as to penetrate into groove bottoms in the second regions of the shoulder lug grooves.

* * * * *